United States Patent
Chang et al.

(10) Patent No.: US 11,249,379 B2
(45) Date of Patent: Feb. 15, 2022

(54) ILLUMINATION SYSTEM AND PROJECTION APPARATUS

(71) Applicant: Coretronic Corporation, Hsin-Chu (TW)

(72) Inventors: Hsin-Yueh Chang, Hsin-Chu (TW); Haw-Woei Pan, Hsin-Chu (TW); Chi-Tang Hsieh, Hsin-Chu (TW)

(73) Assignee: Coretronic Corporation, Hsin-Chu (TW)

(*) Notice: Subject to any disclaimer, the term of this patent is extended or adjusted under 35 U.S.C. 154(b) by 482 days.

(21) Appl. No.: 16/247,583

(22) Filed: Jan. 15, 2019

(65) Prior Publication Data
US 2019/0227418 A1 Jul. 25, 2019

(30) Foreign Application Priority Data
Jan. 19, 2018 (CN) .......................... 201810053521.1

(51) Int. Cl.
*G03B 21/20* (2006.01)
*G03B 33/12* (2006.01)
(Continued)

(52) U.S. Cl.
CPC .......... *G03B 21/204* (2013.01); *G02B 27/10* (2013.01); *G03B 21/00* (2013.01); *G03B 21/008* (2013.01);
(Continued)

(58) Field of Classification Search
CPC ........... G02B 26/008; G03B 21/00–64; H04N 9/31–3197
See application file for complete search history.

(56) References Cited

U.S. PATENT DOCUMENTS

2014/0347634 A1* 11/2014 Bommerbach ...... H04N 9/3158
353/31
2015/0098070 A1 4/2015 Hsieh et al.
(Continued)

FOREIGN PATENT DOCUMENTS

CN 2525547 12/2002
CN 104238248 12/2014
(Continued)

OTHER PUBLICATIONS

"Search Report of Europe Counterpart Application", dated Mar. 1, 2019, p. 1-p. 9.
(Continued)

*Primary Examiner* — Michelle M Iacoletti
*Assistant Examiner* — Christopher A Lamb, II
(74) *Attorney, Agent, or Firm* — JCIPRNET

(57) ABSTRACT

An illumination system including first, second and third light sources, a splitting element and a wavelength conversion element is provided. The first light source emits a first light beam. The second light source emits a second light beam. The third light source emits a third light beam. The splitting element is disposed on transmission paths of the first, the second and the third light beams. The splitting element reflects the first and the third light beams, and allows the second light beam to pass through. During a first time period, the first light beam is transmitted to a first position and the second light beam is transmitted to a second position. During a second time period, the third light beam is transmitted to the first position and the second light beam is transmitted to the second position. Furthermore, a projection apparatus is also provided.

11 Claims, 25 Drawing Sheets

(51) Int. Cl.
*G03B 21/14* (2006.01)
*G03B 21/00* (2006.01)
*G02B 27/10* (2006.01)

(52) U.S. Cl.
CPC ......... *G03B 21/142* (2013.01); *G03B 21/206* (2013.01); *G03B 21/2066* (2013.01); *G03B 33/12* (2013.01)

(56) References Cited

U.S. PATENT DOCUMENTS

| | | | |
|---|---|---|---|
| 2016/0147135 A1 | 5/2016 | Cheng | |
| 2017/0277029 A1* | 9/2017 | Chang | B32B 17/00 |
| 2017/0293212 A1 | 10/2017 | Wang et al. | |
| 2018/0129123 A1* | 5/2018 | Guo | H04N 9/3161 |

FOREIGN PATENT DOCUMENTS

| | | | |
|---|---|---|---|
| CN | 104267567 | 1/2015 | |
| CN | 104345534 | 2/2015 | |
| CN | 104980721 | 10/2015 | |
| CN | 105022212 | 11/2015 | |
| CN | 103792635 | 2/2016 | |
| CN | 105652572 | 6/2016 | |
| CN | 106162116 | 11/2016 | |
| CN | 104216210 | 1/2017 | |
| CN | 106412535 | 2/2017 | |
| CN | 107450261 | 12/2017 | |
| JP | 2014021223 | 2/2014 | |
| JP | 2015031876 | 2/2015 | |
| TW | M331685 | 5/2008 | |
| TW | 201514603 | 4/2015 | |
| TW | 201514604 | 4/2015 | |
| TW | 201542966 | 11/2015 | |
| TW | M547687 | 8/2017 | |
| WO | 2016143274 | 9/2016 | |
| WO | WO-2016161924 A1 * | 10/2016 | ........... G03B 21/204 |

OTHER PUBLICATIONS

"Office Action of China Counterpart Application", dated Sep. 27, 2020, p. 1-p. 11.

* cited by examiner

ILLUMINATION SYSTEM AND PROJECTION APPARATUS

CROSS-REFERENCE TO RELATED APPLICATION

This application claims the priority benefit of China application serial no. 201810053521.1, filed on Jan. 19, 2018. The entirety of the above-mentioned patent application is hereby incorporated by reference herein and made a part of this specification.

BACKGROUND OF THE INVENTION

1. Field of the Invention

The invention relates to a projection apparatus having dual light valves, and more particularly, to an illumination system for the projection apparatus having dual light valves.

2. Description of Related Art

In the architecture of a double-piece digital light processing (DLP) projector, a phosphor and a reflective region (or transmissive region) of a phosphor wheel are sequentially irradiated by a blue laser beam to output yellow light and blue light, so two elementary color lights may then be formed by red light and green light in yellow light through a beam-splitter mirror in the projector. Accordingly, three color lights including blue, green and red may be formed. Said three color lights are transmitted to two light valves in the double-piece DLP projector in different time sequences. In detail, during a time period in which the blue laser beam is irradiated to the phosphor, yellow light emitted from the phosphor is split into red light and green light by the beam-splitter mirror. The beam-splitter mirror transmits red light and green light to the two light valves at different positions by different light transmission paths according to different wavelength ranges. However, during a time period in which blue light is transmitted to the reflective region (or transmissive region), because blue light is a monochromatic light, the beam-splitter mirror is unable to simultaneously transmit blue light to the two light valves but simply transmits blue light to one light valve among the two light valves. As a result of aforementioned situation, since the color light is not received by the other light valve, such light valve will be in an idle state to lower optical efficiency of the double-piece DLP projector. Meanwhile, the phenomenon of picture color interruption will also occur, resulting in poor image quality.

On the other hand, to increase a ratio of red light projected by the architecture of said projector, one approach is to use a filter coating for yellow light to further filter out a green light beam in yellow light in order to obtain red light. Yet, if the wavelength range of green light filtered out from yellow light is overly small, red light obtained through filtering may have poor colorimetric purity. If the wavelength range of green light filtered out from yellow light is overly large, red light obtained through filtering may have low brightness. These conditions will lead to poor image quality or low image brightness.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention were acknowledged by a person of ordinary skill in the art.

SUMMARY OF THE INVENTION

The invention provides an illumination system, which is capable of allowing a projection apparatus applying the illumination system to have favorable optical efficiency and favorable image quality.

The invention provides a projection apparatus having favorable optical efficiency and favorable image quality.

Other objects and advantages of the invention can be further illustrated by the technical features broadly embodied and described as follows.

To achieve one, a part, or all of the above objectives or other objectives, an embodiment of the invention proposes an illumination system. The illumination system includes a first light source, a second light source, a third light source, a splitting element and a wavelength conversion element. The first light source emits a first light beam. The second light source emits a second light beam. The third light source emits a third light beam. The splitting element is disposed on transmission paths of the first, the second and the third light beams. The splitting element reflects the third light beam and the first light beam, and allows the second light beam to pass through. The wavelength conversion element comprises a wavelength conversion material. The wavelength conversion element has a first region and a second region. A concentration of the wavelength conversion material in the first region is greater than a concentration of the wavelength conversion material in the second region. The third light beam serves as an exciting light beam. The first region and the second region sequentially enter into a transmission path of the third light beam such that the third light beam is transmitted to an irradiation region of the wavelength conversion material. The irradiation region serves as a conversion light source, the conversion light source comprises the first light source and the second light source or the first light source and at least part of the second light source. The conversion light source emits a fourth light beam, the fourth light beam comprises the first light beam and the second light beam. The splitting element is disposed on the transmission paths of the third light beam and the fourth light beam. The splitting element reflects the first light beam and the third light beam and allows the second light beam to pass through. The third light beam excites the wavelength conversion material in the first region to make the conversion light source emit the fourth light beam. During a first time period, the third light source emits the third light beam, and the third light beam is transmitted to the irradiation region of the wavelength conversion material to emit the fourth light beam. The fourth light beam is split by the splitting element to form the first light beam and the second light beam. The first light beam is transmitted to a first position by the splitting element, and the second light beam is transmitted to a second position by the splitting element. The first position is different from the second position. During a second time period, the third light source emits the third light beam such that at least part of the third light beam is operated by the wavelength conversion element and transmits to the splitting element. The third light beam is transmitted to the first position by the splitting element, and the second light source emits the second light beam, the second light beam is transmitted to the second position by the splitting element.

To achieve one, a part, or all of the above objectives or other objectives, an embodiment of the invention proposes a projection apparatus. The projection apparatus includes the illumination system described above, a first light valve, a second light valve and a projection lens. The first light valve is disposed at the first position, and configured to receive the first light beam or the third light beam and correspondingly convert the first light beam and the third light beam into a first image light beam and a third image light beam respectively. The second light valve is disposed at the second position, and configured to receive the second light beam and correspondingly convert the second light beam into a second image light beam. The projection lens is disposed on transmission paths of the first image light beam, the second image light beam and the third image light beam.

Based on the above, in the illumination system according to the embodiments of the invention, with disposition of the splitting element, the first light beam and the second light beam are transmitted to the different first and second positions during the first time period, and the third light beam and the second light beam are transmitted to the different first and second positions during the second time period. As a result, the first and the second light valves respectively at two different (first and second) positions can receive the light beams during the first and the second time periods for converting the corresponding image light beams to reduce the idle condition so optical efficiency and image quality may be improved for the entire projection apparatus.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
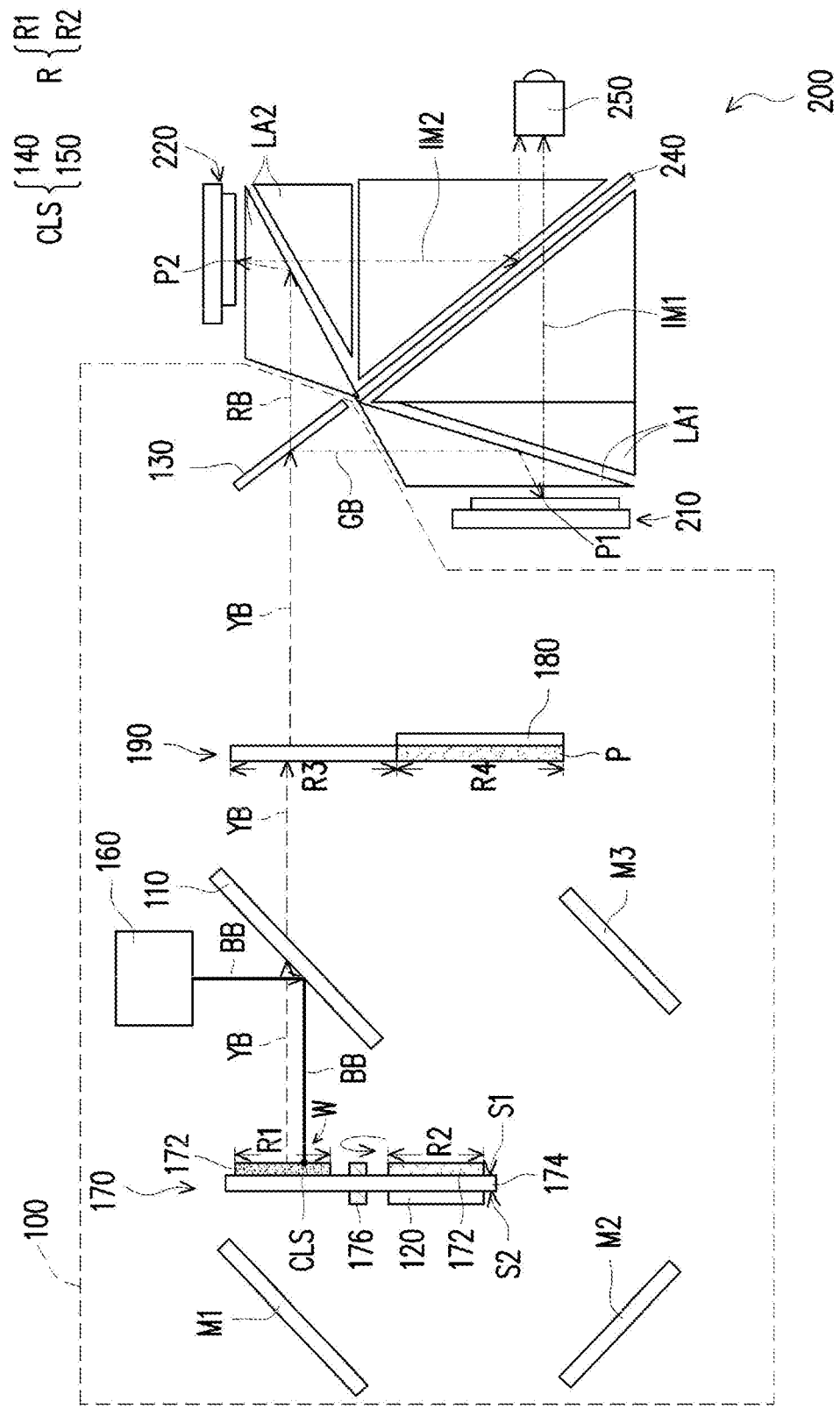
FIG. 1A is a schematic diagram of optical paths of a projection apparatus during a first time period in an embodiment of the invention.
Figure 1B:
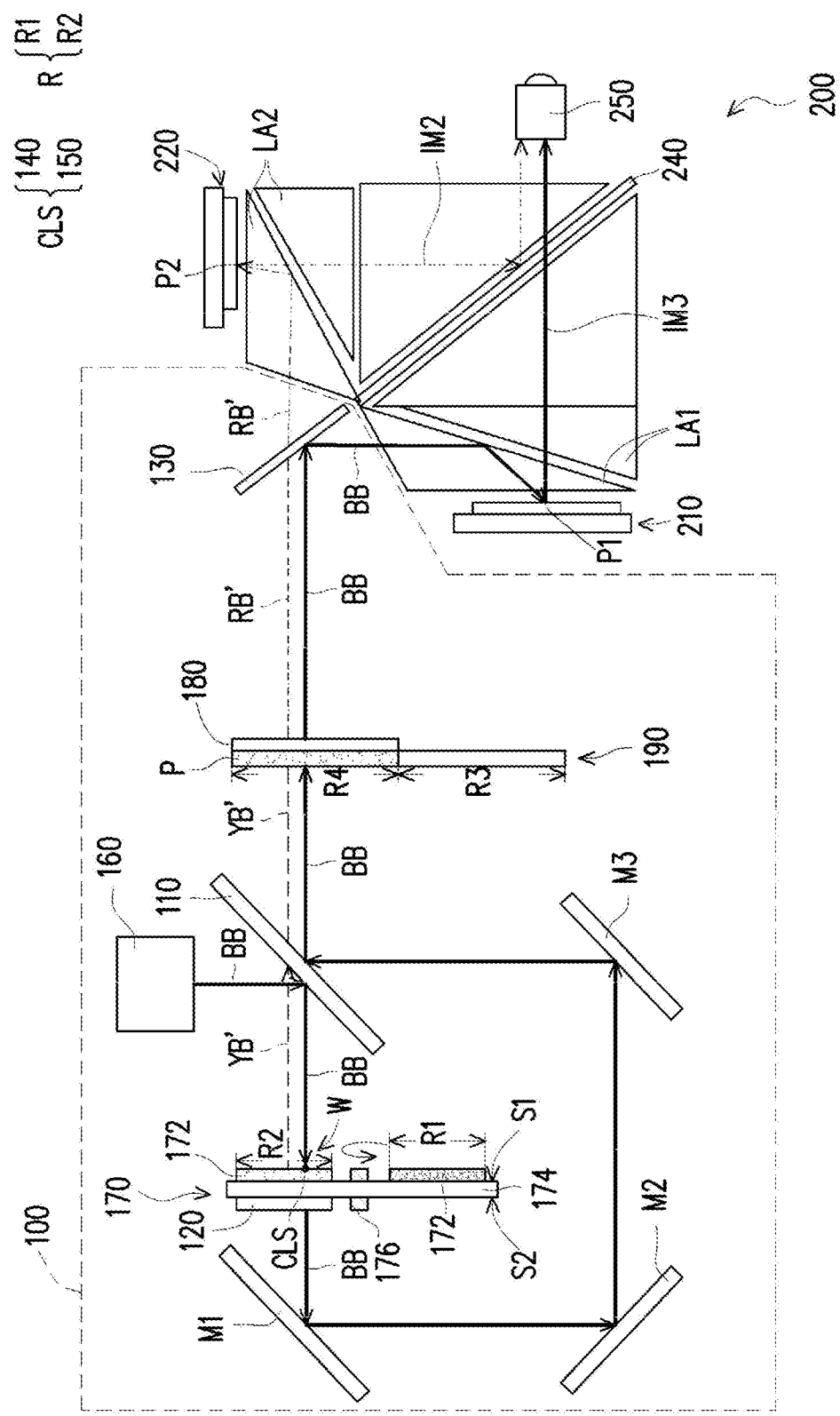
FIG. 1B is a schematic diagram of optical paths of the projection apparatus of FIG. 1A during a second time period.
Figure 2:
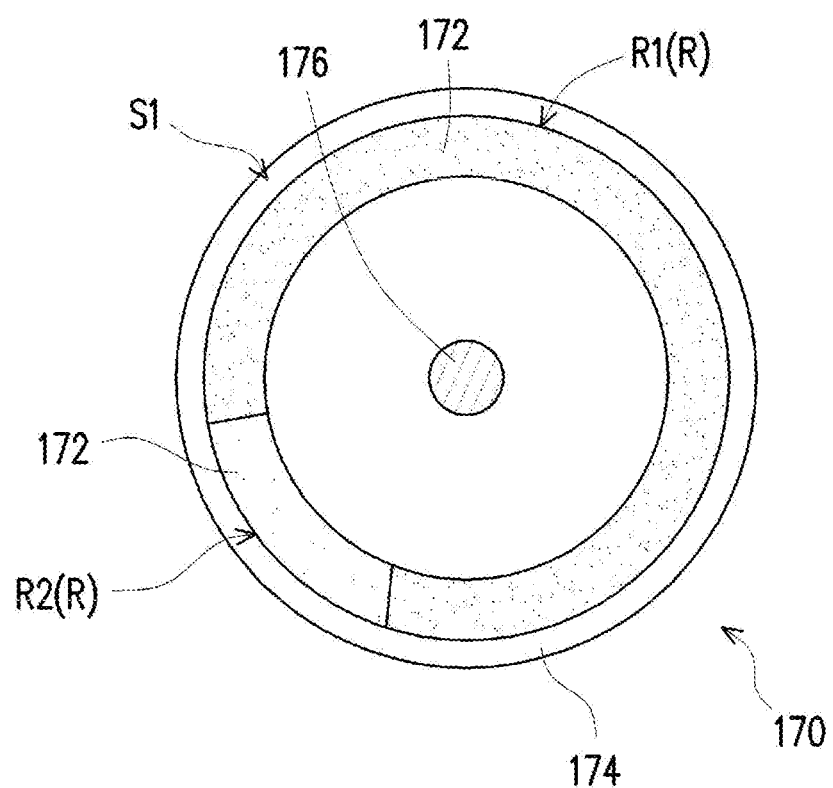
FIG. 2 is a schematic front view of a wavelength conversion element in FIG. 1A and FIG. 1B.
Figure 3:
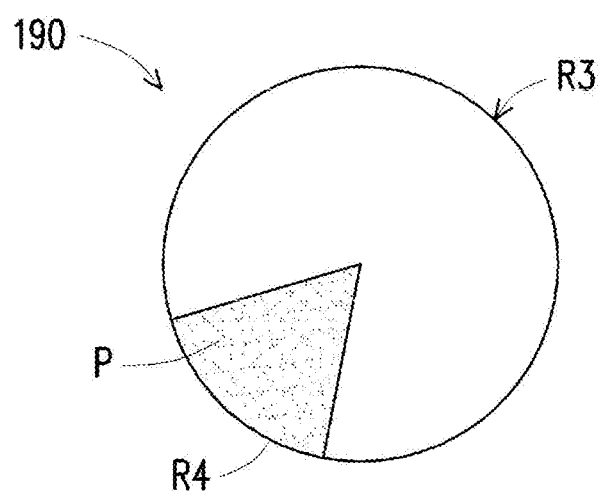
FIG. 3 is a schematic front view of a scattering element in FIG. 1A and FIG. 1B.
Figure 4:
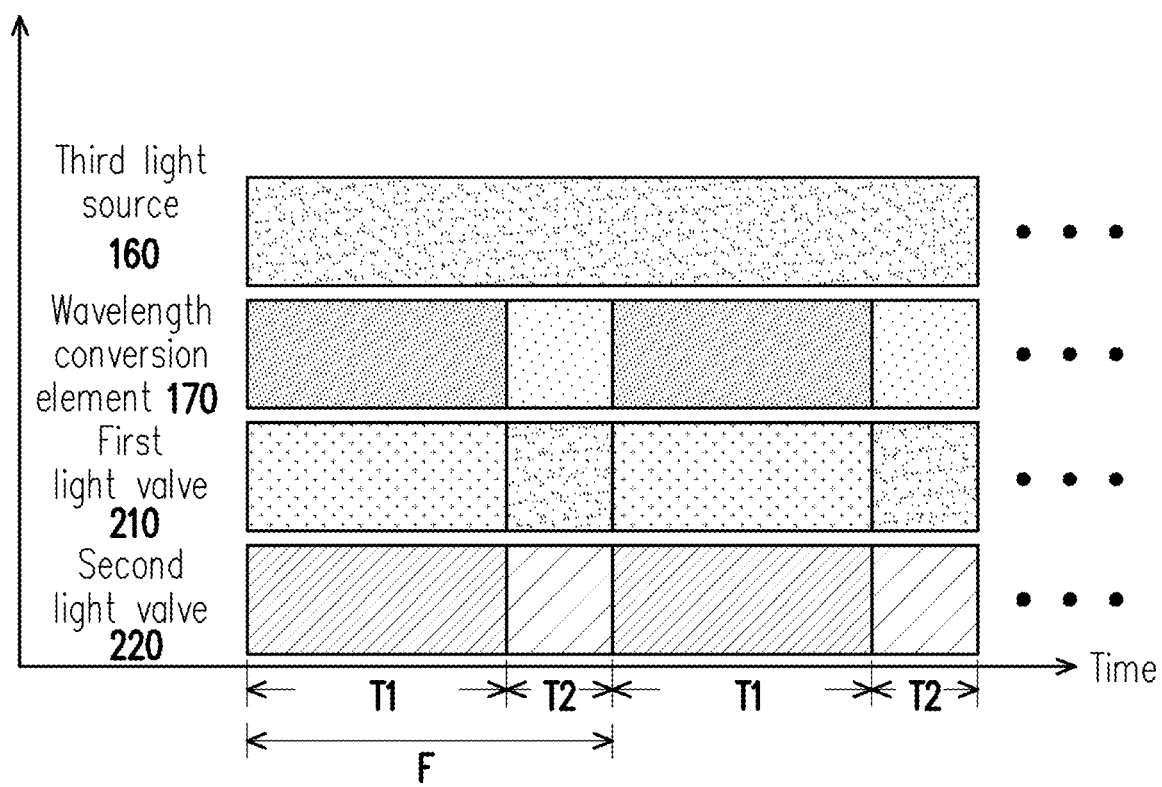
FIG. 4 is a schematic diagram of colors of light beams emitted by a third light source and the wavelength conversion element in FIG. 1A and FIG. 1B during different time periods and is a schematic diagram of colors of light beams correspondingly received by first and second light valves in FIG. 1A and FIG. 1B during different time periods.

FIG. 1A is a schematic diagram of optical paths of a projection apparatus during a first time period in an embodiment of the invention. FIG. 1B is a schematic diagram of optical paths of the projection apparatus of FIG. 1A during a second time period. FIG. 2 is a schematic front view of a wavelength conversion element in FIG. 1A and FIG. 1B. FIG. 3 is a schematic front view of a scattering element in FIG. 1A and FIG. 1B. FIG. 4 is a schematic diagram of colors of light beams emitted by a third light source and the wavelength conversion element in FIG. 1A and FIG. 1B during different time periods and is a schematic diagram of colors of light beams correspondingly received by first and second light valves in FIG. 1A and FIG. 1B during different time periods.

With reference to FIG. 1A and FIG. 1B, in this embodiment, a projection apparatus 200 includes an illumination system 100, a first light valve 210, a second light valve 220 and a projection lens 250. The illumination system 100 is configured to output light beams to the first light valve 210 and the second light valve 220, respectively. The first light valve 210 and the second light valve 220 are located at different positions in the projection apparatus 200. The illumination system 100 includes a first splitting element 110, a second splitting element 120, a third splitting element 130, a first light source 140, a second light source 150, a third light source 160, a wavelength conversion element 170, a filter element 180 and a scattering element 190. The projection apparatus 200 further includes a fourth splitting element 240. Aforementioned elements will be described in detail in the following paragraphs.

The splitting element described in the embodiments of the invention refers to an optical element having beam-splitting function. In this embodiment, the splitting element is a dichroic mirror (DM) with wavelength selectivity, such as a dichroic piece conducting color splitting by utilizing limitations on wavelengths/colors, but not limited thereto. In this embodiment, the first splitting element 110 of the illumination system 100 is designed as a splitting element capable of reflecting a light beam in a blue light wavelength range and allowing a light beam in a yellow light wavelength range to pass through. The second splitting element 120 is designed as a splitting element capable of reflecting the light beam in the yellow light wavelength range and allowing the light beam in the blue light wavelength range to pass through. The third splitting element 130 is designed as a splitting element capable of reflecting the light beam in the blue light wavelength range and a light beam in a green light wavelength range and allowing a light beam in a red light wavelength range to pass through. The fourth splitting element 240 is designed as a splitting element capable of allowing the light beam in the blue light wavelength range and the light beam in the green light wavelength range to pass through and reflecting the light beam in the red light wavelength range.

The first light source 140, the second light source 150 and the third light source 160 described in the embodiments of the invention generally refer to light sources capable of emitting a first light beam GB, a second light beam RB and a third light beam BB, respectively. The first light beam GB is the light beam in the green wavelength range, the second light beam RB is the light beam in the red wavelength range, and the third light beam BB is the light beam in the blue wavelength range. The third light source 160 may serve as an exciting light source for providing an exciting light beam. Aforementioned light sources include, for example, a light-emitting diode (LED) or a laser diode (LD), and may be array light sources formed by one of abovementioned types of the light sources or more than one of abovementioned types of the light sources, but the invention is not limited thereto. A peak wavelength of the first light beam GB falls within a wavelength range of 470 nm to 570 nm, or falls within a wavelength range of 500 nm to 565 nm, for example. A peak wavelength of the second light beam RB falls within a wavelength range of 570 nm to 650 nm, or falls within a wavelength range of 625 nm to 740 nm, for example. A peak wavelength of the third light beam BB falls within a wavelength range of 445 nm to 470 nm, or falls within a wavelength of 400 nm to 470 nm, for example. The peak wavelength is defined as a wavelength corresponding to a maximum light intensity.

In the embodiments of the invention, the wavelength conversion element 170 is an optical element configured to convert a short wavelength light beam passing through the wavelength conversion element 170 into a long wavelength light beam with respect to the short wavelength light beam.

In this embodiment, the wavelength conversion element 170 is a transmissive phosphor wheel, but not limited thereto. The transmissive phosphor wheel will be described in more details below. With reference to FIG. 1A, FIG. 1B and FIG. 2, specifically, the wavelength conversion element 170 includes a wavelength conversion material 172, a substrate 174 and a rotation shaft 176. The wavelength conversion material 172 described in the embodiments of the invention can receive the short wavelength light beam and generates a corresponding converted light beam through a photoluminescence phenomenon. The wavelength conversion material 172 includes a phosphor, and the phosphor is covered by a colloid to form a phosphor adhesive layer. For example, the phosphor may be a yellow phosphor, but not limited thereto. When the wavelength conversion material 172 is the phosphor that can be excited to emit the light beam in the yellow wavelength range, this so-called yellow phosphor may be excited by the exciting light beam to convert at least part of the exciting light beam into a fourth light beam. The fourth light beam has a yellow light spectrum, which is the light beam in the yellow wavelength range with the peak wavelength between 535 nm and 570 nm. Here, the light beam in the yellow wavelength range is broadly defined as between 470 nm and 650 nm. The substrate 174 is, for example, a transparent substrate having surfaces S1 and S2 opposite to each other. The surface S1 faces the first splitting element 110. The rotation shaft 176 is inserted to the substrate 174 and coupled to a driver element (not shown) to drive the wavelength conversion element 130 to rotate.

Referring to FIG. 2, in this embodiment, the wavelength conversion element 170 includes a wavelength conversion region R. The wavelength conversion material 172 is disposed on the surface S1 of the substrate 174 in a circular manner to define the wavelength conversion region R. The wavelength conversion region R includes a first region R1 and a second region R2. The first region R1 occupies, for example, 5/6 of the entire wavelength conversion region R, and the second region R2 occupies, for example, 1/6 of the entire wavelength conversion region R. However, the invention is not limited to the above, and the ratios may be adjusted by persons skilled in the art based on design requirements. A concentration of the wavelength conversion material 172 in the first region R1 is greater than a concentration of the wavelength conversion material 172 in the second region R2. The concentration of the wavelength conversion material 172 in the second region R2 is greater than zero. In other words, the first region R1 is defined as a region in which the wavelength conversion material 172 is more concentrated and, the second region R2 is defined as a region in which the wavelength conversion material 172 is less concentrated. More specifically, how concentrated the region would be is defined by the degree of light conversion per unit area. If the exciting light beam (i.e. the third beam BB) is transmitted to the first region R1, at least 98% or more of the exciting light beam is converted by the wavelength conversion material 132 in the first region R1. If the exciting light beam is transmitted to the second region R2, at least 65% or less of the third light beam BB is converted by the wavelength conversion material 172 in the second region R2. In other embodiments, if the exciting light beam is transmitted to the second region R2, at least 20% or more of the exciting light beam will pass through the second region R2 without being converted by the wavelength conversion material 172 in the second region R2. In addition, the substrate 174 is, for example, an aluminum substrate that can reflect a fourth light beam YB (which is converted from the exciting light beam by the wavelength conversion material 172 in the first region R1) to the first splitting element 110. In another embodiment, a high reflective layer may be coated on the substrate 174 with respect to the first region R1 to reflect the fourth light beam YB to the first splitting element 110. The second region R2 is a transparent region made of, for example, a glass material.

The filter element 180 described in the embodiments of the invention generally refers to an optical element capable of filtering out a light beam in a specific wavelength range and allowing light beams other than the light beam in the specific wavelength range to pass through. In this embodiment, the filter element 180 is, for example, green light filter film, which can filter out the first light beam and allow light beams other than the first beam to pass through. More specifically, the filter element 180 can filter out the light beam in the green light wavelength range and allowing light beams other than the light beam in the green light wavelength range to pass through.

The scattering element 190 in the embodiments of the invention is an optical element for scattering/diffusing the light beam passing through the scattering element 190 in order to change a traveling path of the light beam. The scattering element 190 is, for example, a diffuser wheel, a diffuser plate, an optical element having scatter particles or a scatter structure, which are not particularly limited by the invention. With reference to FIG. 3, in this embodiment, the scattering element 190 is the diffuser wheel. The scattering element 190 includes a third region R3 and a fourth region R4. The third region R3 of the scattering element 190 is a transparent region with light transmission function. The fourth region R4 of the scattering element 190 includes scatter particles or a scatter structure P for scattering light beams. The third light beam BB may be scattered by the scatter particles or the scatter structure P in the fourth region R4 to reduce or eliminate a speckle phenomenon. If the third light beam BB is a laser beam, a coherence of the laser beam may be destroyed. The third region R3 of the scattering element 190 occupies, for example, 5/6 of the entire scattering element 190, and the fourth region R4 occupies, for example, 1/6 of the entire scattering element 190. With the entire scattering element 190 being 360 degrees, the third region R3 corresponds to the first region R1 of the wavelength conversion element 170 (e.g., 300 degrees), and the fourth region R4 corresponds to the second region R2 of the wavelength conversion element 170 (e.g., 60 degrees). However, the invention is not limited to the above, and the ratios may be adjusted by persons skilled in the art based on design requirements.

The light valves (the first light valve 210 and the second light valve 220) in the embodiments of the invention refer to any one of spatial light modulators including a digital micro-mirror device (DMD), a liquid-crystal-on-silicon panel (LCOS panel) or a liquid crystal panel (LCD), but not limited thereto. In this embodiment, the first light valve 210 and the second light valve 220 are digital micro-mirror elements.

The projection lens 250 in the embodiments of the invention includes, for example, a combination of one or more optical lenses having refracting powers. The optical lenses include, for example, various combinations among non-planar lenses such as a biconcave lens, a biconvex lens, a concavo-convex lens, convexo-convex lens, a plano-convex and a plano-concave lens. Forms and types of the projection lens 250 are not particularly limited by the invention.

Further, in this embodiment, one or more reflective mirrors M1 to M3 and scattering elements (not shown) may be optionally added inside the illumination system 100, and the reflective mirrors M1 to M3 are configured to guide the third light beam BB to an optical path. A first dichroic prism group LA1 and a second dichroic prism group LA2 may also be optionally added inside the projection apparatus 200 to adjust paths for the light beams outputted by the projection apparatus 200.

Disposition relationship among aforementioned elements and their optical behaviors in the projection apparatus 200 will be described more specifically in the following paragraphs.

With reference to FIG. 1A and FIG. 1B, the first splitting element 110 is disposed on transmission paths of the third light beam BB, the fourth light beam YB and a fifth light beam YB'. The fourth light beam YB and the fifth light beam YB' may be light beams having a wavelength range of 470 nm to 650 nm and the color of yellow. The second splitting element 120 is disposed in the second region R2 of the wavelength conversion element 170 and disposed on the surface S2. The wavelength conversion region R of the wavelength conversion element 170 is disposed on the transmission path of the third light beam BB. The filter element 180 is disposed in the fourth region R4 of the scattering element 190. The scattering element 190 is disposed on the transmission paths of the third light beam BB, the fourth light beam YB and the fifth light beam YB'. The first light valve 210 is disposed at a first position P1, and configured to receive the first light beam GB or the third light beam BB. The second light valve 220 is disposed at a second position P2 different from the first position P1, and configured to receive the second light beam RB. The fourth splitting element 240 is disposed on transmission paths of first, second and third image light beams IM1 to IM3. The reflective mirrors M1 to M3 are disposed on the transmission path of the third light beam BB. The first dichroic prism group LA1 is disposed on the transmission paths of the third light beam BB and the first light beam GB. The second dichroic prism group LA2 is disposed on the transmission path of the second slight beam RB.

The driver element of the wavelength conversion element 170 drives the rotation shaft 176 to make the first region R1 and the second region R2 sequentially enter into the transmission path of the third light beam BB in a rotating manner. In this embodiment, by ways of synchronously rotating the wavelength conversion element 170 and the scattering element 190, the illumination system 100 can make the third region R3 of the scattering element 190 correspond to the first region R1 of the wavelength conversion element 170 and make the fourth region R4 of the scattering element 190 correspond to the second region R2 of the wavelength conversion element 170. More specifically, a light beam correspondingly formed from the third light beam BB affected by the first region R1 passes through the third region R3, and a light beam correspondingly formed from the third light beam BB affected the second region R2 passes through the fourth region R4.

In this embodiment, a light source form of the third light source 160 is a physical light-emitting element, which is, for example, a blue laser emitting element or a blue light-emitting diode. First of all, with reference to FIG. 1A and FIG. 4, a time period in which the third light beam BB is transmitted to the first region R1 is a first time period T1. During the first time period T1, the third light source 160 emits the third light beam BB, which is then reflected by the first splitting element 110 and thus transmitted to the first region R1 of the wavelength conversion region R. In this embodiment, the third light beam BB serves as the exciting light beam. The third light beam BB is transmitted to an irradiation region W of the wavelength conversion material 172. The irradiation region W of the wavelength conversion material 172 can emit a converted light beam (i.e., the fourth light beam YB) after being excited by the third light beam BB and then serve as a conversion light source CLS. The conversion light source CLS may be regarded as including the first light source 140 and the second light source 150. The fourth light beam YB emitted by the conversion light source CLS may be regarded as a light beam combined from the first light beam GB and the second light beam RB respectively emitted by the first light source 140 and the second light source 150. The third light beam BB excites the wavelength conversion material 172 in the first region R1 to make the conversion light source CLS emit the fourth light beam YB. The fourth light beam YB is transmitted to the third splitting element 130 after passing through the first splitting element 110 and the third region R3 of the scattering element 190. The third splitting element 130 reflects the first light beam GB in the fourth light beam YB and allows the second light beam RB in the fourth light beam YB to pass through. In the other words, the third splitting element 130 splits the fourth light beam YB to form the first light beam GB and the second light beam RB. In this way, during the first time period T1, the illumination system 100 outputs the second light beam RB and the first light beam GB. The fourth light beam YB (including the first light beam GB and the second light beam RB) are formed from the wavelength conversion material 172.

Next, during the first time period T1, the first light beam GB is transmitted to the first light valve 210 disposed at the first position P1 via a first optical path by the third splitting element 130 and the first dichroic prism group LA1. The first light valve 210 converts the first light beam GB into the first image light beam IM1. The first image light beam IM1 is transmitted to the projection lens 250 after passing through the fourth splitting element 240. On the other hand, the second light beam RB is transmitted to the second light valve 220 disposed at the second position P2 via a second optical path by the third splitting element 130 and the second dichroic prism group LA2. The second light valve 220 converts the second light beam RB into the second image light beam IM2. The second image light beam IM2 is transmitted to the projection lens 250 after being reflected by the fourth splitting element 240. The projection lens 250 then transmits the first and the second image light beams IM1 and IM2 to a projection medium (e.g., a projection screen, not shown) in order to form an image frame. Therefore, during the first time period T1, the first light valve 210 can receive the first light beam GB. The second light valve 220 can receive the second light beam RB.

With reference to FIG. 1B and FIG. 4, a time period in which the third light beam BB is transmitted to the second region R2 is a second time period T2. The first time period T1 and the second time period T2 are two consecutive time periods defined as one frame F. During the second time period T2, the third light source 160 emits the third light beam BB, which is then reflected by the first splitting element 110 and thus transmitted to the second region R2 of the wavelength conversion region R. A part of the third light beam BB is transmitted to the wavelength conversion material 172 in the second region R2 to make the wavelength conversion material 172 emit the fifth light beam YB'. It should be noted that, because the concentration of the wavelength conversion material 172 in the first region R1 is greater than the concentration of the wavelength conversion material 172 in the second region R2, a light intensity of the fourth light beam YB (yellow light) will be greater than a light intensity of the fifth light beam YB' (yellow light). The fourth light beam YB and the fifth light beam YB' have the same wavelength range but different light intensities. After being reflected by the second splitting element 120, the fifth light beam YB' is transmitted towards the first splitting element 110 and passes through the first splitting element 110. Next, the fifth light beam YB' includes the first light beam GB and the second light beam RB. In the fifth light beam YB', a first light beam GB' (not shown) is filtered out by the filter element 180, and only a second light beam RB' (red light) is allowed to pass through. The second light beam RB' passes through the third splitting element 130. On the other hand, most of the third light beam BB is transmitted to the third splitting element 130 after being affected by the wavelength conversion element 170 (most of the third light beam BB are allowed to pass through or reflected by the second region R2 of the wavelength conversion element 170). Specifically, after passing through the second region R2 and the second splitting element 120, most of the third light beam BB enters into the first splitting element 110 in another direction through the reflective mirrors M1 to M3 and then reflected to the fourth region R4 of the scattering element 190 by the first splitting element 110. The third light beam BB may be scattered by the scatter particles or the scatter structure P in the fourth region R4 to reduce the speckle phenomenon. Next, the third light beam BB is then transmitted to the third splitting element 130 and reflected by the third splitting element 130. In this way, during the second time period T2, the illumination system 100 outputs the second light beam RB' and the third light beam BB.

Next, during the second time period T2, the third light beam BB is transmitted to the first light valve 210 disposed at the first position P1 via the first optical path by the third splitting element 130 and the first dichroic prism group LA1. The first light valve 210 converts the third light beam GB into the third image light beam IM3. The third image light beam IM3 is transmitted to the projection lens 250 after passing through the fourth splitting element 240. On the other hand, the second light beam RB' is transmitted to the second light valve 220 disposed at the second position P2 via the second optical path by the third splitting element 130 and the second dichroic prism group LA2. The second light valve 220 converts the second light beam RB' into the second image light beam IM2. The second image light beam IM2 is transmitted to the projection lens 250 after being reflected by the fourth splitting element 240. The projection lens 250 then transmits the second and the third image light beams IM2 and IM3 to a projection medium (e.g., a projection screen, not shown) in order to form an image frame. Therefore, during the second time period T1, the first light valve 210 can receive the third light beam BB. The second light valve 220 can receive the second light beam RB'.

Based on the above, in the illumination system 100 of this embodiment, with disposition of the third splitting element 130, the first light beam GB and the second light beam RB are transmitted to the different (first and second) positions P1 and P2 during the first time period T1, and the third light beam BB and the second light beam RB' are transmitted to the different (first and second) positions P1 and P2 during the second time period T2. As a result, the first and the second light valves 210 and 220 respectively at two different (first and second) positions P1 and P2 can receive the light beams during the first and the second time periods T1 and T2 for converting the corresponding image light beams to reduce the idle condition so optical efficiency and image quality may be improved for the entire projection apparatus 200.

Next, the third splitting element 130 used by the illumination system 100 of this embodiment is a high pass filter with function of reflecting the third light beam BB and the first light beam GB and allowing the second light beam RB to passes through which can achieve the effect of transmitting the third light beam BB, the first light beam GB and the second light beam RB to the first and the second light valves 210 and 220 at the different positions P1 and P2 during different time periods T1 and T2 as described above. Also, because the splitting element with said function is easy to manufacture, the illumination system 100 may have optical efficiency and image quality of the projection apparatus 200 improved by lower manufacturing costs.

On the other hand, compared to the conventional technology, because the projection apparatus 200 can project the second image light beam IM2 converted from the second light beams RB/RB' during both the first and the second time periods T1 and T2, the time for processing red light can become longer so picture colors can be more saturated.

Here, it should be noted that the following embodiments continue to use certain content in the foregoing embodiment, and description for the same technical contents is omitted. Description regarding same element name can refer to the certain content in the foregoing embodiment, which is not repeated in the following embodiments.

Figure 5A:
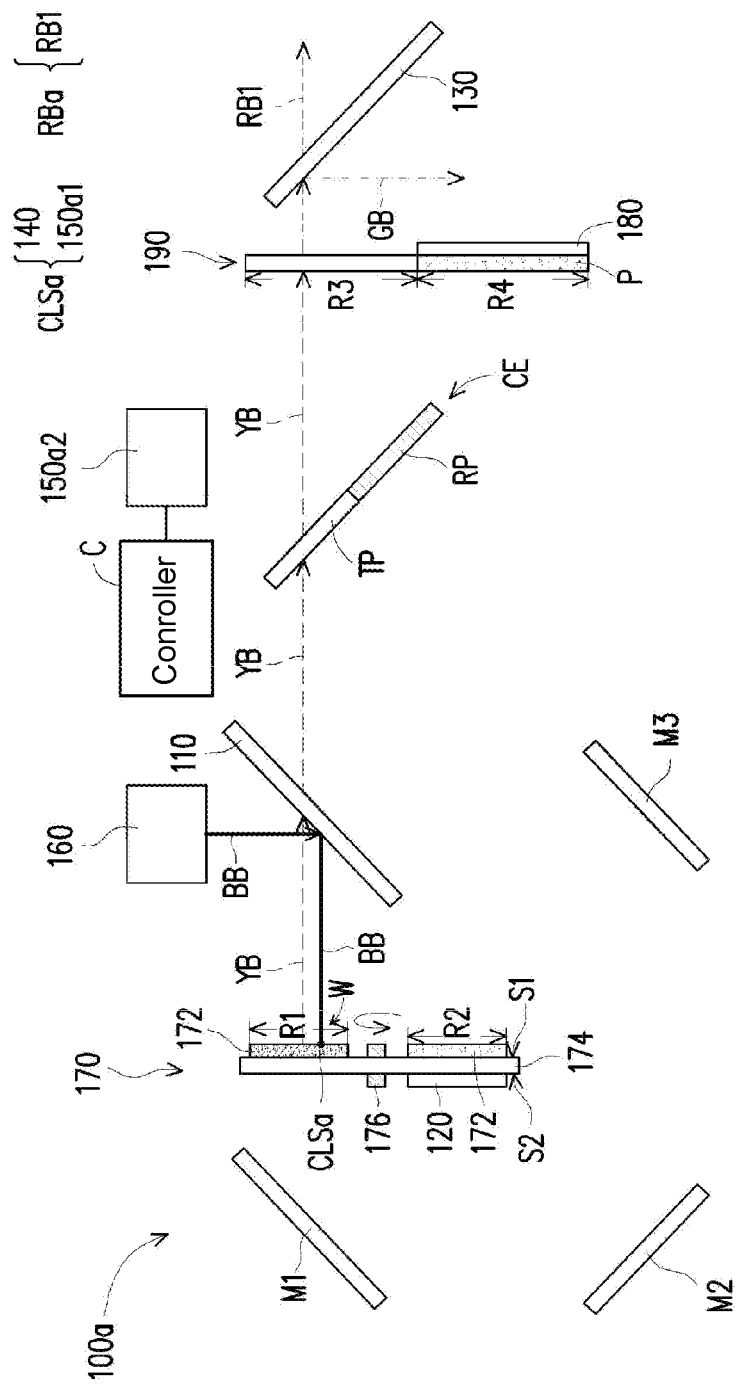
FIG. 5A is a schematic diagram of optical paths of an illumination system during a first time period in another embodiment of the invention.
Figure 5B:
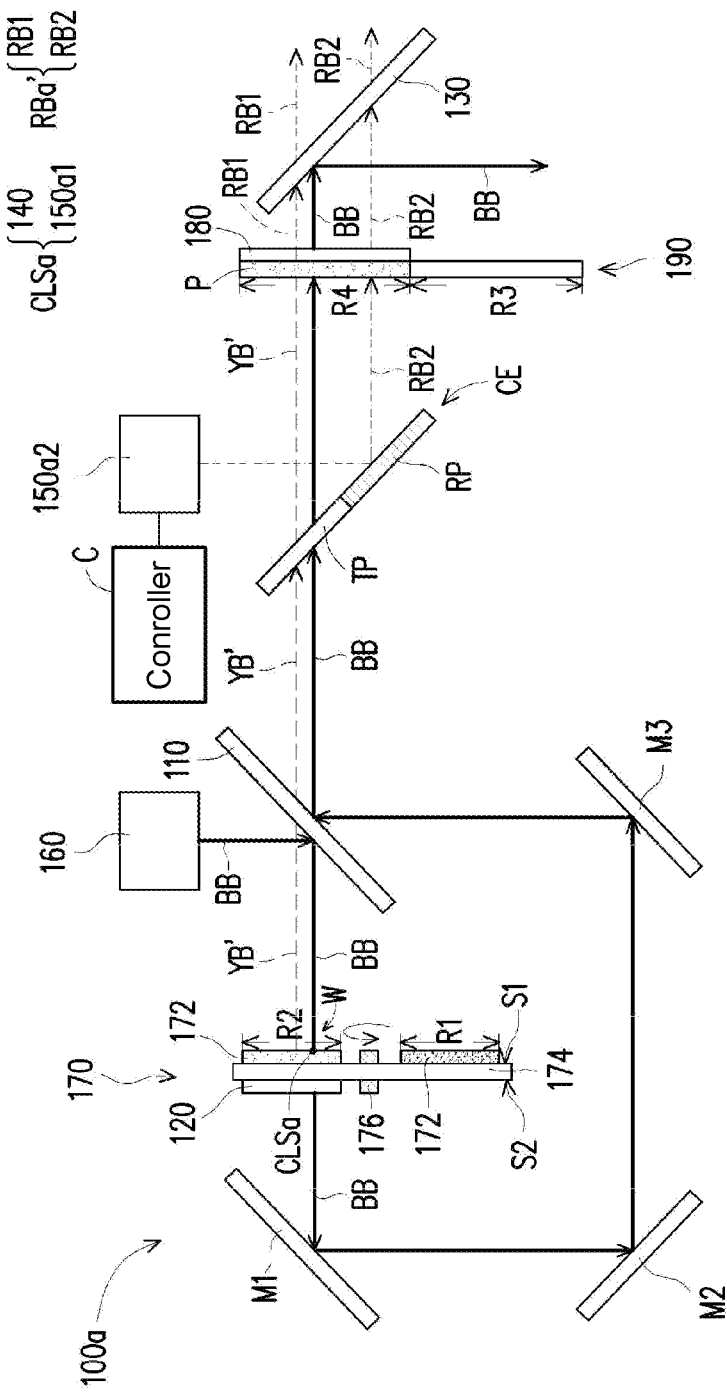
FIG. 5B is a schematic diagram of optical paths of the illumination system of FIG. 5A during a second time period.
Figure 6:
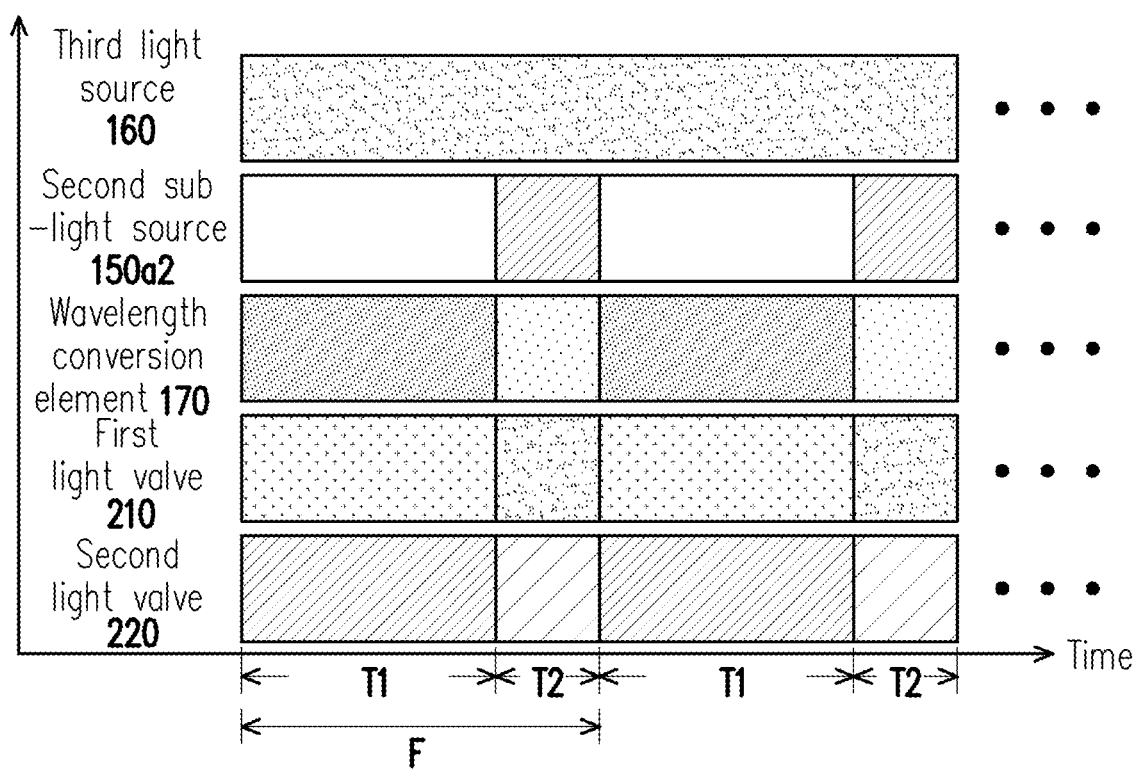
FIG. 6 is a schematic diagram of colors of light beams emitted by a third light source, a second sub-light source and a wavelength conversion element in FIG. 5A and FIG. 5B during different time periods and is a schematic diagram of colors of light beams correspondingly received by first and second light valves in FIG. 5A and FIG. 5B during different time periods.

FIG. 5A is a schematic diagram of optical paths of an illumination system during a first time period in another embodiment of the invention. FIG. 5B is a schematic diagram of optical paths of the illumination system of FIG. 5A during a second time period. FIG. 6 is a schematic diagram of colors of light beams emitted by a third light source, a second sub-light source and a wavelength conversion element in FIG. 5A and FIG. 5B during different time periods and is a schematic diagram of colors of light beams correspondingly received by first and second light valves in FIG. 5A and FIG. 5B during different time periods.

Referring to FIG. 5A and FIG. 5B together, the main architectural difference between an illumination system 100a and the illumination system 100 in FIG. 1A and FIG. 1B is that, a second light source 150a includes a first sub-light source 150a1 and a second sub-light source 150a2. A conversion light source CLSa includes the first sub-light source 150a1. The second sub-light source 150a2 is a red light-emitting element, such as a red laser emitting element or LED. In other words, in this embodiment, the second light source can provide the second light beam from either the conversion light source CLSa or from the red light-emitting element. In the following embodiments, the second light beam in the fourth light beam emitted from the conversion light source CLSa is referred to as a first sub-light beam RB1, and the second light beam emitted by the second sub-light source 150a2 is referred to as a second sub-light beam RB2. Here, the first sub-light beam RB1 and the second sub-light beam RB2 are the light beams in the red wavelength range. The illumination system 100a further includes a controller C and a combiner element CE. The controller C is electrically connected to the second sub-light source 150a2, and configured to control whether the second sub-light source 150a2 emits light or not. The combiner element CE described in the embodiments of the invention refers to an optical element capable of combining more than one light beam into one light beam, such as a beam-combining mirror. The combiner element CE includes a reflective portion RP and a transparent portion TP. The reflective portion RP is disposed on a transmission path of the second sub-light beam RB2. The transparent portion TP is disposed on transmission paths of the fourth light beam YB, the fifth light beam YB' and the third beam BB.

Next, optical behavior of the illumination system 100a will be introduced in the following paragraphs.

With reference to FIG. 5A and FIG. 6, during the first time period T1, the controller C controls the second sub-light source 150a2 not to emit light. Optical behavior of the illumination system 100a is similar to optical behavior of the illumination system 100, and the major difference between the two is that, after passing through the first splitting element 110, the fourth light beam YB formed by the conversion light source CLSa sequentially passes through the transparent portion TP of the combiner element CE and the third region R3 of the scattering element 190 to be transmitted to the third splitting element 130. In this way, during the first time period T1, the illumination system 100a outputs a second light beam RBa (i.e., the first sub-light beam RB1) and the first light beam GB.

With reference to FIG. 5B and FIG. 6, during the second time period T2, optical behavior of the illumination system 100a is similar to optical behavior of the illumination system 100, and the major difference between the two is that, after passing through the wavelength conversion element 170, most of the third light beam BB is reflected by the first splitting element 110 for the second time, and then sequentially passes through the transparent portion TP of the combiner element CE and the fourth region R4 of the scattering element 190 to be transmitted to the third splitting element 130. A small part of the third light beam BB excites the wavelength conversion material 172 in the second region R2 to make the conversion light source CLSa emit the fifth light beam YB'. The conversion light source CLSa includes the first light source 140 and the first sub-light source 150a1. After passing through the first splitting element 110, the fifth light beam YB' sequentially passes through the transparent portion TP and the fourth region R4. Then, the first light beam in the fifth light beam YB' is filtered out by the filter element 180 so the first sub-light beam RB1 can be obtained. The first sub-light beam RB1 serves as at least part of a second light beam RBa'. On the other hand, the controller C controls the second sub-light source 150a2 to emit the second sub-light beam RB2. After being reflected by the reflective portion RP, the second sub-light beam RB2 is sequentially transmitted to the fourth region R4 and the third splitting element 130. Similarly, because the second sub-light beam RB2 is the red light beam (e.g., the red laser beam), the speckle phenomenon may be reduced by the scatter particles or the scatter structure P in the fourth region R4. In this embodiment, the first sub-light beam RB1 and the second sub-light beam RB2 commonly serve as the second light beam RBa'. In this way, during the second time period T2, the illumination system 100a outputs the third light beam BB and the second light beam RBa'.

It should be noted that, the illumination system 100a in FIG. 5A and FIG. 5B can replace the illumination system 100 of FIG. 1A and FIG. 1B to output the light beams to the first and the second light valves 210 and 220 during the first and the second time periods T1 and T2. Behaviors of the light beams outputted by the illumination system 100a during the first and the second time periods T1 and T2 are similar to behaviors of the light beams outputted by the illumination system 100 during the first and the second time periods T1 and T2, and thus related description is not repeated hereinafter.

Compared to the illumination system 100, the second light beam RBa' provided by the illumination system 100a of this embodiment during the second time period T2 includes the first sub-light beam RB1 from the conversion light source CLSa and the second sub-light beam RB2 from the red light-emitting element (i.e., the second sub-light source 150a2). Therefore, in an image frame projected by the projection apparatus applying the illumination system 100a, brightness of red light and color purity of red light are better.

On the other hand, compared to the conventional technology, because the second light beam RBa' provided by the illumination system of this embodiment further includes the second sub-light beam RB2 to take both brightness and color purity of red light into account, the image frame projected by the projection apparatus applying the illumination system 100a can provide favorable image quality and higher brightness.

Because the projection apparatus 200 can project the second image light beam IM2 converted from the second light beams RB/RB' during both the first and the second time periods T1 and T2, the time for processing red light can become longer so the projected image frame can provide favorable image quality and higher brightness.

In other embodiments, the combiner element CE of the illumination system in another embodiment is, for example, a dichroic mirror (DM) configured to reflect the second sub-light beam RB2 and allow the third light beam BB, the fourth light beam YB and the fifth light beam YB' to pass through to be transmitted to the scattering element 190. It is noted that, in this embodiment, because the combiner element CE is the dichroic mirror, the first sub-light beam RB1 in the fourth light beam YB is reflected rather than entering the scattering element 190.

Figure 7A:
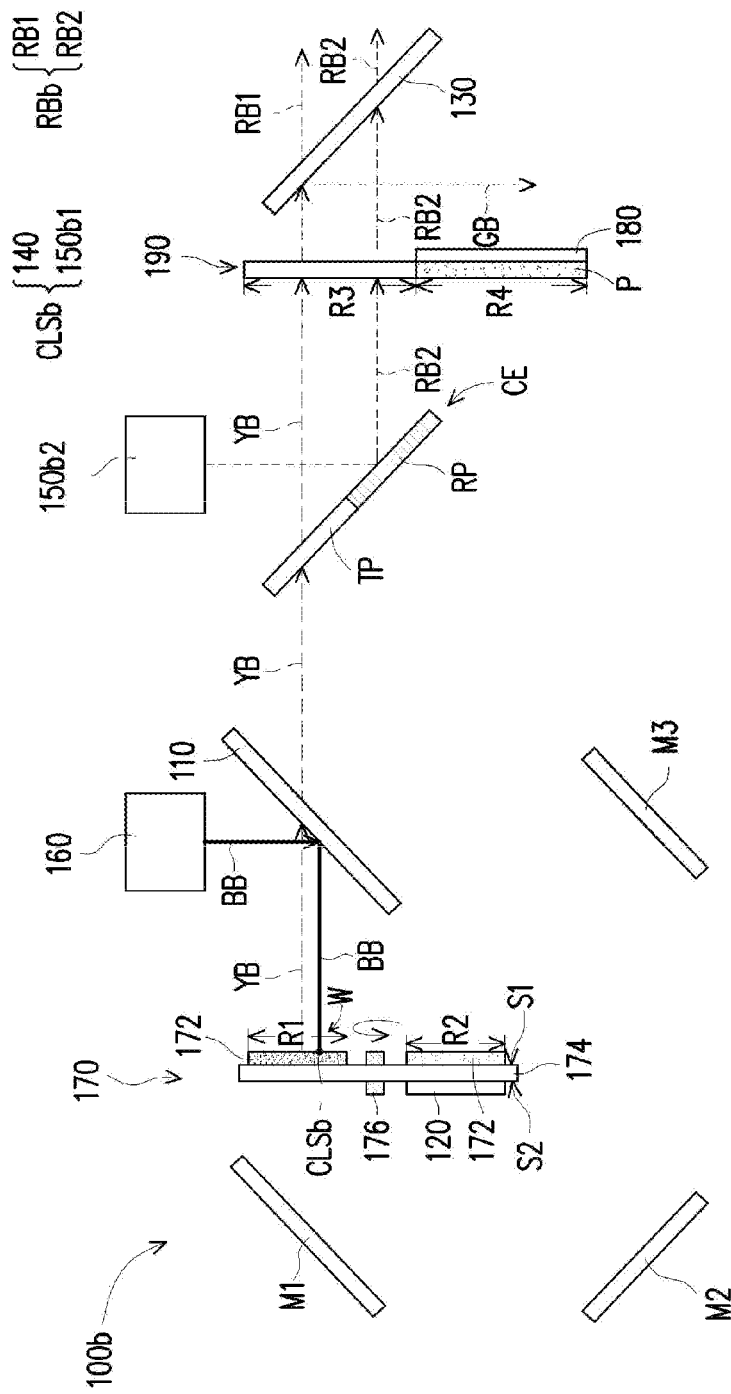
FIG. 7A is a schematic diagram of optical paths of an illumination system during a first time period in another embodiment of the invention.
Figure 7B:
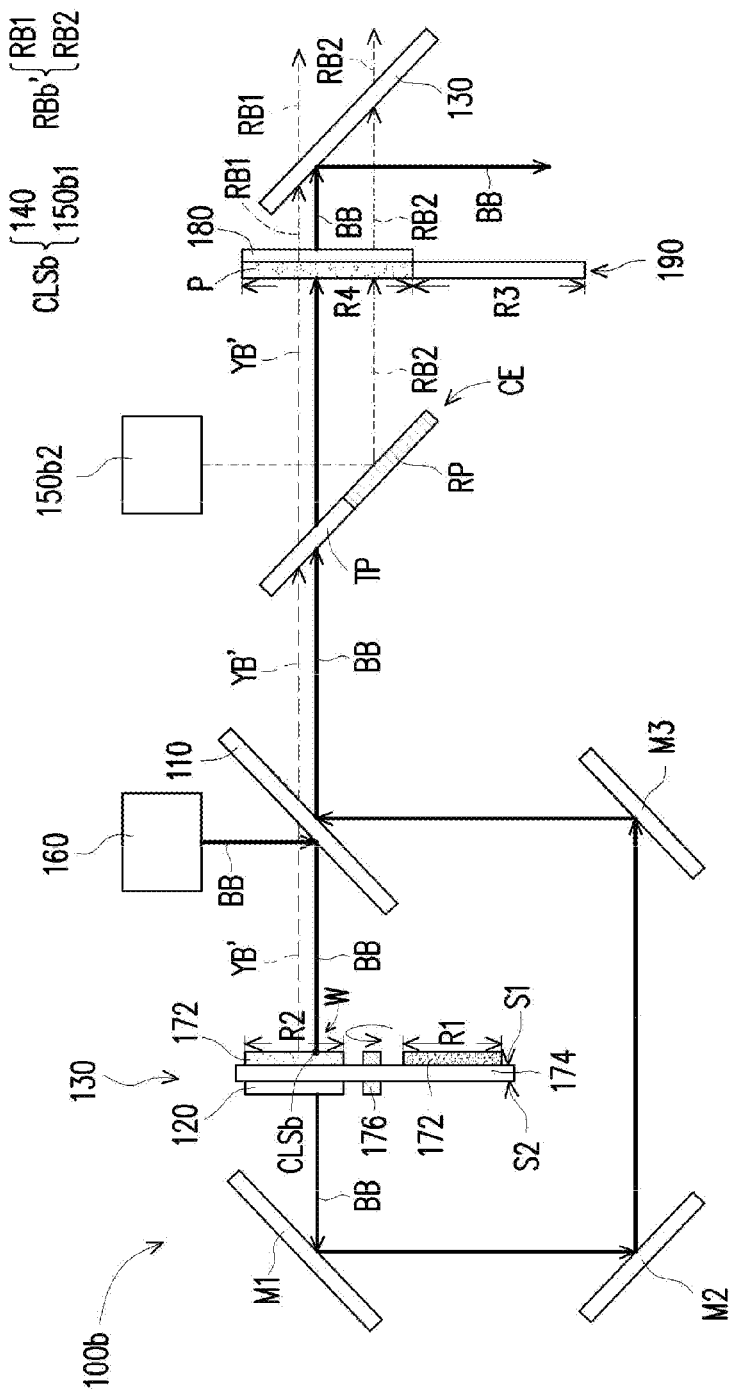
FIG. 7B is a schematic diagram of optical paths of the illumination system of FIG. 7A during a second time period.
Figure 8:
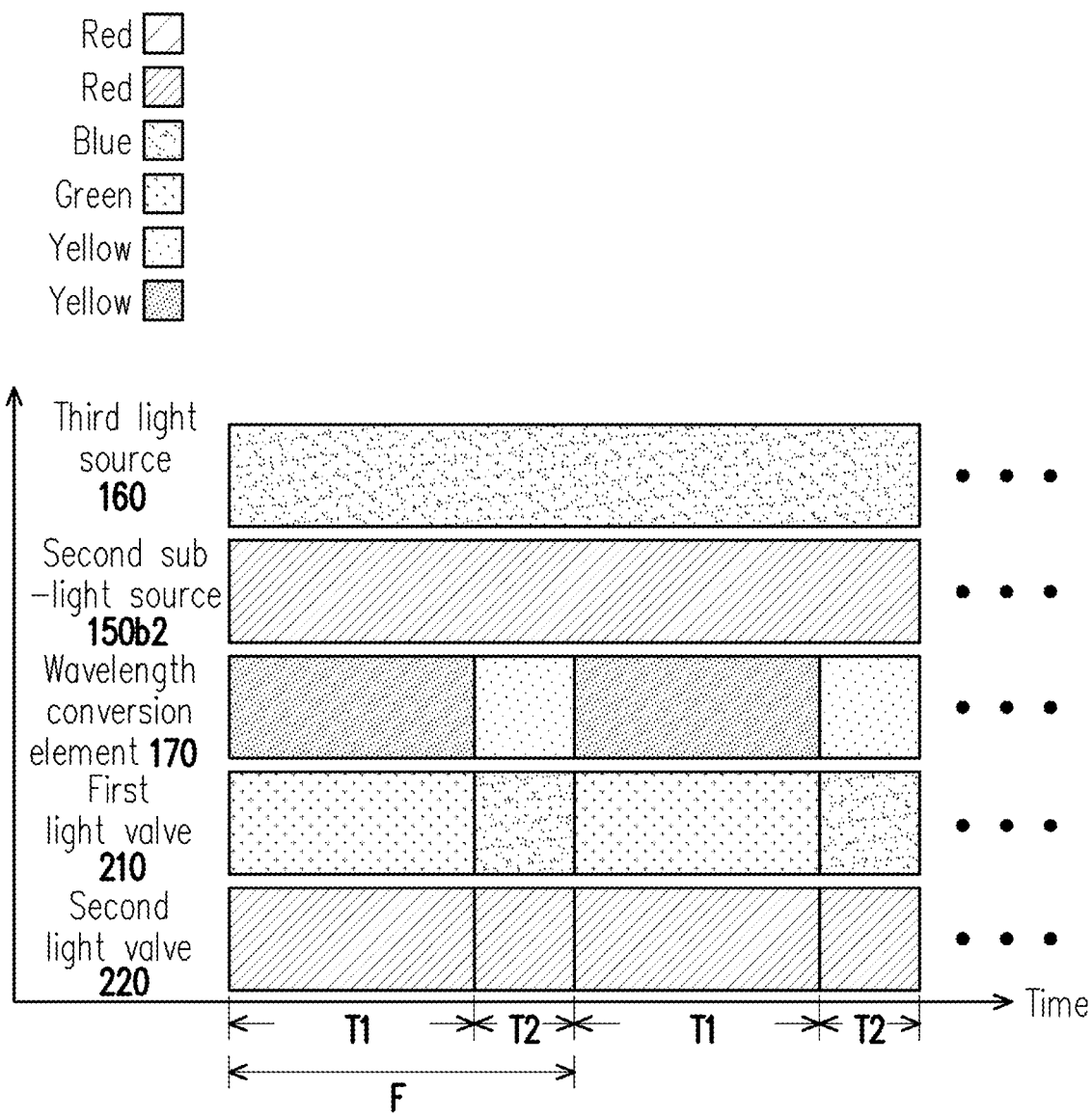
FIG. 8 is a schematic diagram of colors of light beams emitted by a third light source, a second sub-light source and a wavelength conversion element in FIG. 7A and FIG. 7B during different time periods and is a schematic diagram of colors of light beams correspondingly received by first and second light valves in FIG. 7A and FIG. 7B during different time periods.

FIG. 7A is a schematic diagram of optical paths of an illumination system during a first time period in another embodiment of the invention. FIG. 7B is a schematic diagram of optical paths of the illumination system of FIG. 7A during a second time period. FIG. 8 is a schematic diagram of colors of light beams emitted by a third light source, a second sub-light source and a wavelength conversion element in FIG. 7A and FIG. 7B during different time periods and is a schematic diagram of colors of light beams correspondingly received by first and second light valves in FIG. 7A and FIG. 7B during different time periods.

Referring to FIG. 7A and FIG. 7B together, the major difference between an illumination system 100b and the illumination system 100a of FIG. 5A and FIG. 5B is that, the illumination system 100b does not include the controller C while other components are substantially the same so related description is not repeated hereinafter.

With reference to FIG. 7A and FIG. 8, during the first time period T1, optical behavior of the illumination system 100b is similar to optical behavior of the illumination system 100a, and the major difference between the two is that, a second sub-light source 150b2 emits the second sub-light beam RB2. After being reflected by the reflective portion RP, the second sub-light beam RB2 sequentially passes through the third region R3 and the third splitting element 130. The second light beam in the fourth light beam YB serves as the first sub-light beam RB1. The first sub-light beam RB1 and the second sub-light beam RB2 commonly serve as a second light beam RBb. The first light beam GB in the fourth light beam YB is reflected by the third splitting element 130. In this way, during the first time period T1, the illumination system 100b outputs the second light beam RBb and the first light beam GB.

With reference to FIG. 7B and FIG. 8, during the second time period T2, optical behavior of the illumination system 100b is similar to optical behavior of the illumination system 100a, and thus related description is not repeated hereinafter. In this way, during the second time period T2, the illumination system 100b outputs the third light beam BB and a second light beam RBb'.

It should be noted that, the illumination system 100b in FIG. 7A and FIG. 7B can replace the illumination system 100 of FIG. 1A and FIG. 1B to output the light beams to the first and the second light valves 210 and 220 during the first and the second time periods T1 and T2. Behaviors of the light beams outputted by the illumination system 100b during the first and the second time periods T1 and T2 are similar to behaviors of the light beams outputted by the illumination system 100 during the first and the second time periods T1 and T2, and thus related description is not repeated hereinafter.

Compared to the illumination system 100a, because the second sub-light source 150b2 in the illumination system 100b in this embodiment continuously provides the second sub-light beam RB2 during the first and the second time periods T1 and T2, it is not required to control the second sub-light source 150b2 to be turned on or off during the different time periods. Moreover, during the first and the second time periods T1 and T2, in addition to the first sub-light beam RB1 provided by a conversion light source CLSb, the second beam RBb outputted by the illumination system 100b further includes the second sub-light beam RB2 provided by the second sub-light source 150b2. Therefore, in an image frame projected by the projection apparatus applying the illumination system 100b, brightness of red light and color purity of red light are better.

Figure 9A:
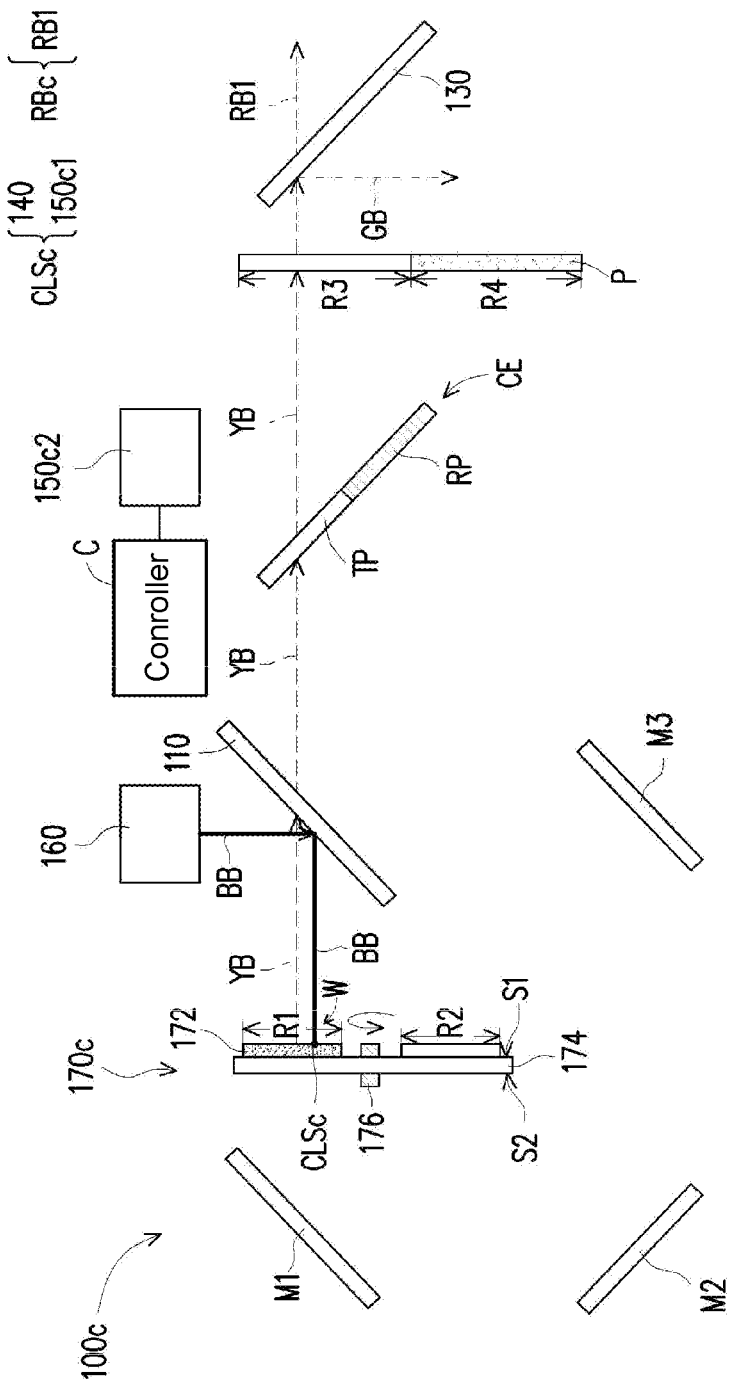
FIG. 9A is a schematic diagram of optical paths of an illumination system during a first time period in another embodiment of the invention.
Figure 9B:
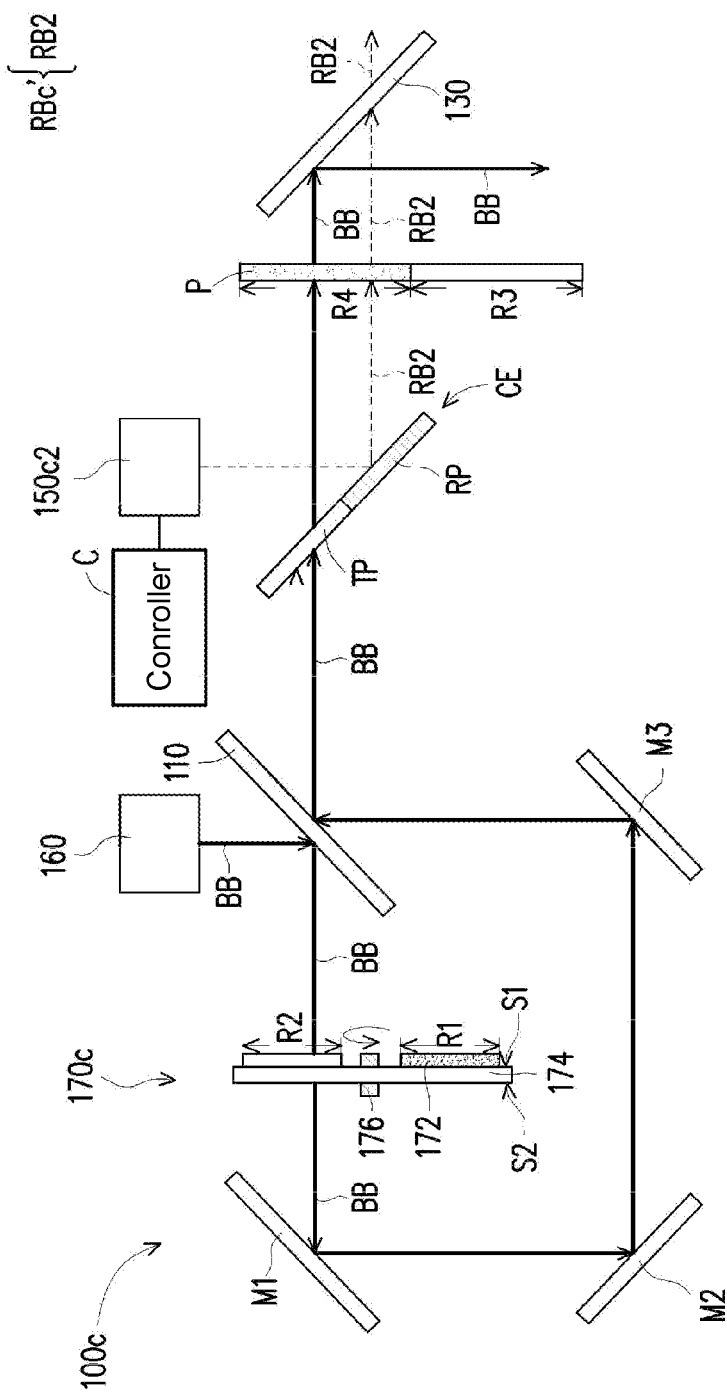
FIG. 9B is a schematic diagram of optical paths of the illumination system of FIG. 9A during a second time period.
Figure 10:
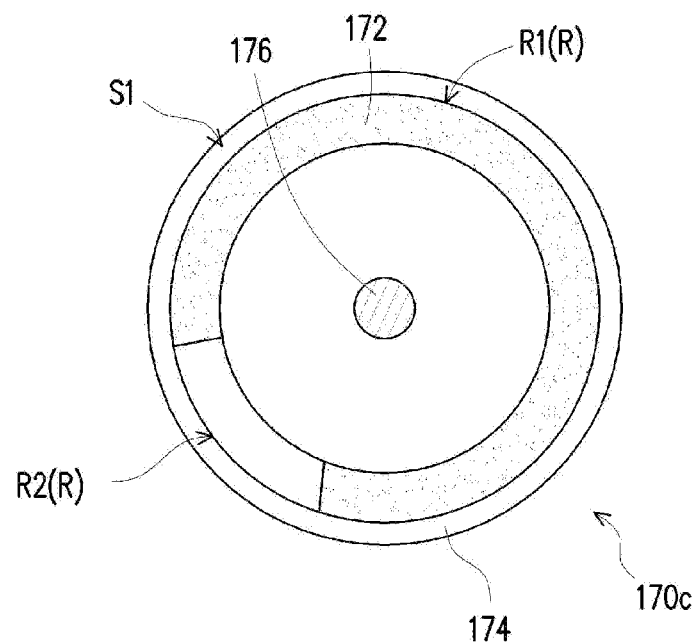
FIG. 10 is a schematic front view of a wavelength conversion element in FIG. 9A and FIG. 9B.
Figure 11:
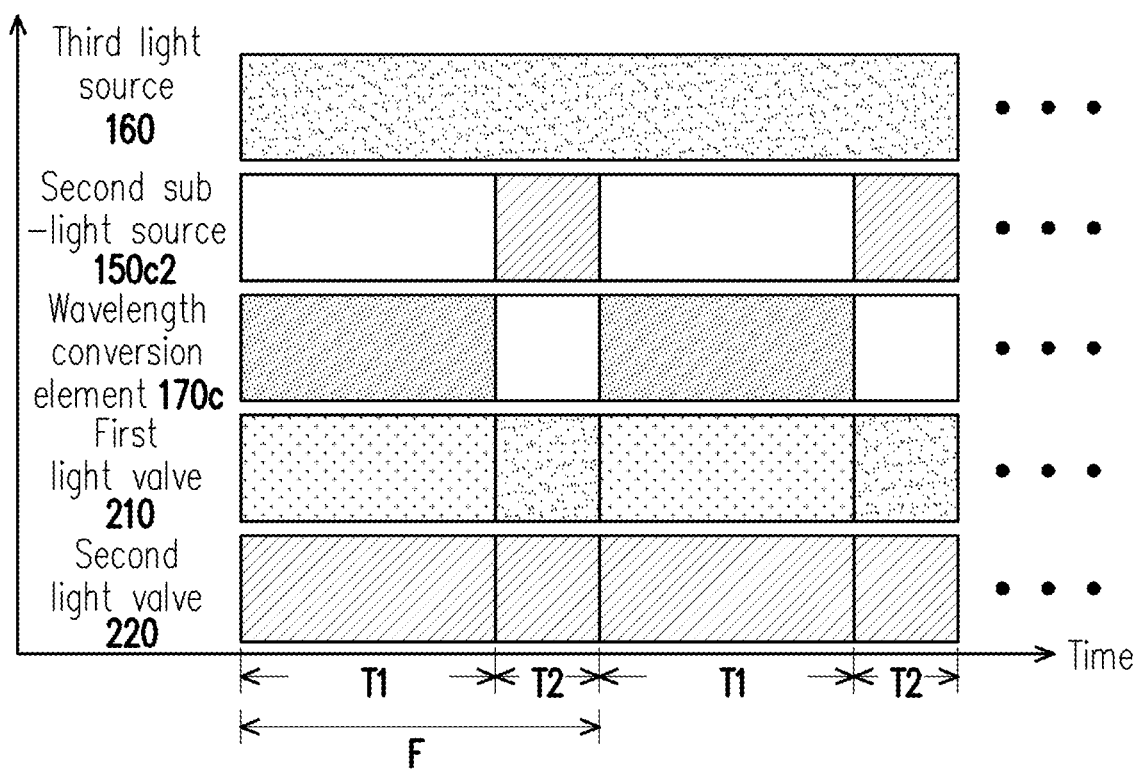
FIG. 11 is a schematic diagram of colors of light beams emitted by a third light source, a second sub-light source and a wavelength conversion element in FIG. 9A and FIG. 9B during different time periods and is a schematic diagram of colors of light beams correspondingly received by first and second light valves in FIG. 9A and FIG. 9B during different time periods.

FIG. 9A is a schematic diagram of optical paths of an illumination system during a first time period in another embodiment of the invention. FIG. 9B is a schematic diagram of optical paths of the illumination system of FIG. 9A during a second time period. FIG. 10 is a schematic front view of a wavelength conversion element in FIG. 9A and FIG. 9B. FIG. 11 is a schematic diagram of colors of light beams emitted by a third light source, a second sub-light source and a wavelength conversion element in FIG. 9A and FIG. 9B during different time periods and is a schematic diagram of colors of light beams correspondingly received by first and second light valves in FIG. 9A and FIG. 9B during different time periods.

Referring to FIG. 9A, FIG. 9B and FIG. 10 together, the main architectural difference between an illumination system 100c and the illumination system 100a of FIG. 5A and FIG. 5B is that, the illumination system 100c of this embodiment does not include the filter element 180 and the second splitting element 120. Furthermore, the concentration of the wavelength conversion material 172 in the second region R2 is equal to zero. In other words, the second region R2 does not include the wavelength conversion material 172. Next, optical behavior of the illumination system 100c will be introduced in the following paragraphs.

With reference to FIG. 9A, FIG. 10 and FIG. 11, during the first time period T1, the controller C controls a second sub-light source 150c2 not to emit light. Optical behavior of the illumination system 100c is similar to optical behavior of the illumination system 100a, and thus related description is not repeated hereinafter. In this way, during the first time period T1, the illumination system 100c outputs a second light beam RBc and the first light beam GB, wherein the second light beam RBc includes the first-sub beam RB1.

With reference to FIG. 9B, FIG. 10 and FIG. 11, during the second time period T2, the controller C controls the second sub-light source 150c2 to emit the second sub-light beam RB2. Optical behavior of the illumination system 100c is similar to optical behavior of the illumination system 100a, and the major difference between the two is that, the concentration of the wavelength conversion material 172 in the second region R2 is zero, that is, the wavelength conversion material 172 is not disposed in the second region R2. When the third light beam BB is irradiated on the second region R2, the fifth light beam will not be generated. In this embodiment, during the second time period T2, the second sub-light beam RB2 emitted by the second sub-light source 150c2 serves as a second light beam RBc'. The illumination system 100c outputs the third light beam BB and the second light beam RBc'.

It should be noted that, the illumination system 100c in FIG. 9A and FIG. 9B can replace the illumination system 100 of FIG. 1A and FIG. 1B to output the light beams to the first and the second light valves 210 and 220 during the first and the second time periods T1 and T2. Behaviors of the light beams outputted by the illumination system 100c during the first and the second time periods T1 and T2 are similar to behaviors of the light beams outputted by the illumination system 100 during the first and the second time periods T1 and T2, and thus related description is not repeated hereinafter. Compared to the illumination system 100a, the third light beam BB provided by the illumination system 100c during the second time period T2 is not being converted by the wavelength conversion material 172. Therefore, in an image frame projected by the projection apparatus applying the illumination system 100c, brightness of blue light is better.

Figure 12A:
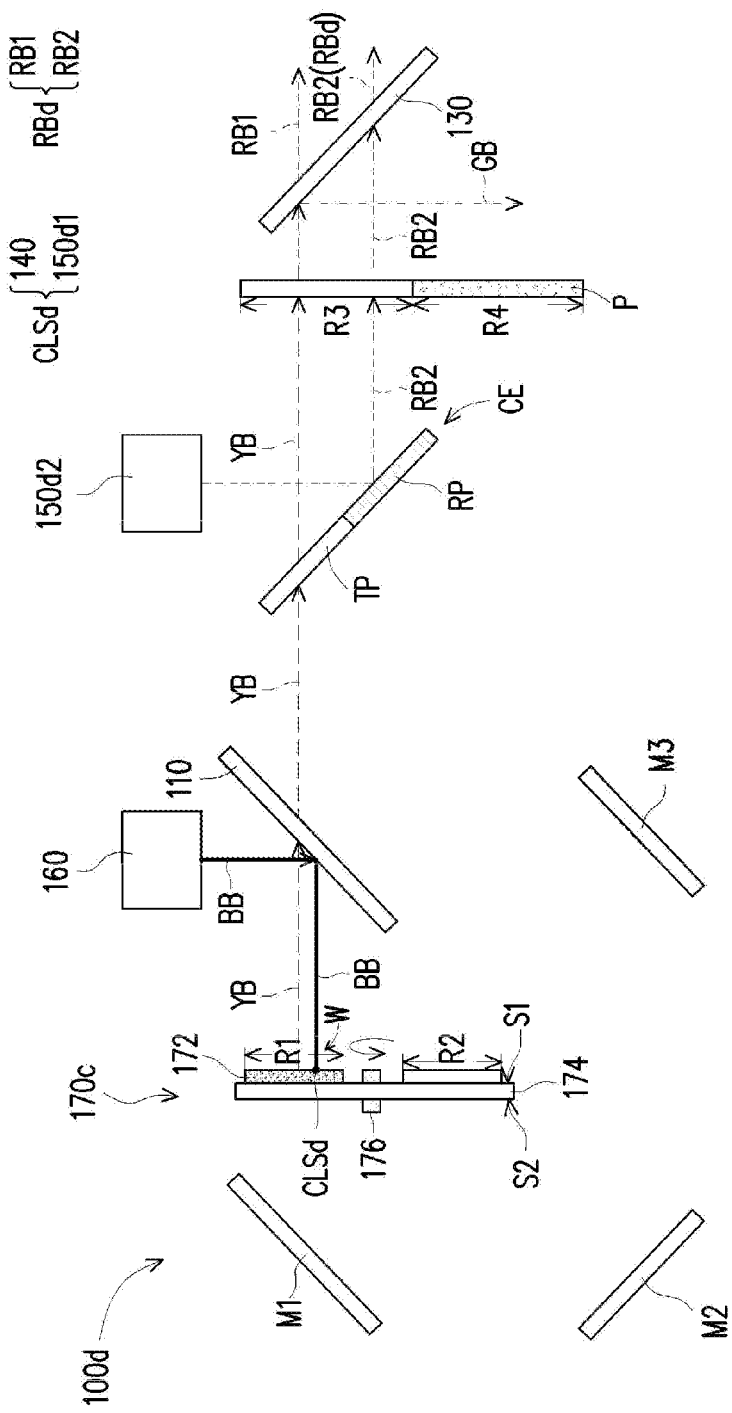
FIG. 12A is a schematic diagram of optical paths of an illumination system during a first time period in another embodiment of the invention.
Figure 12B:
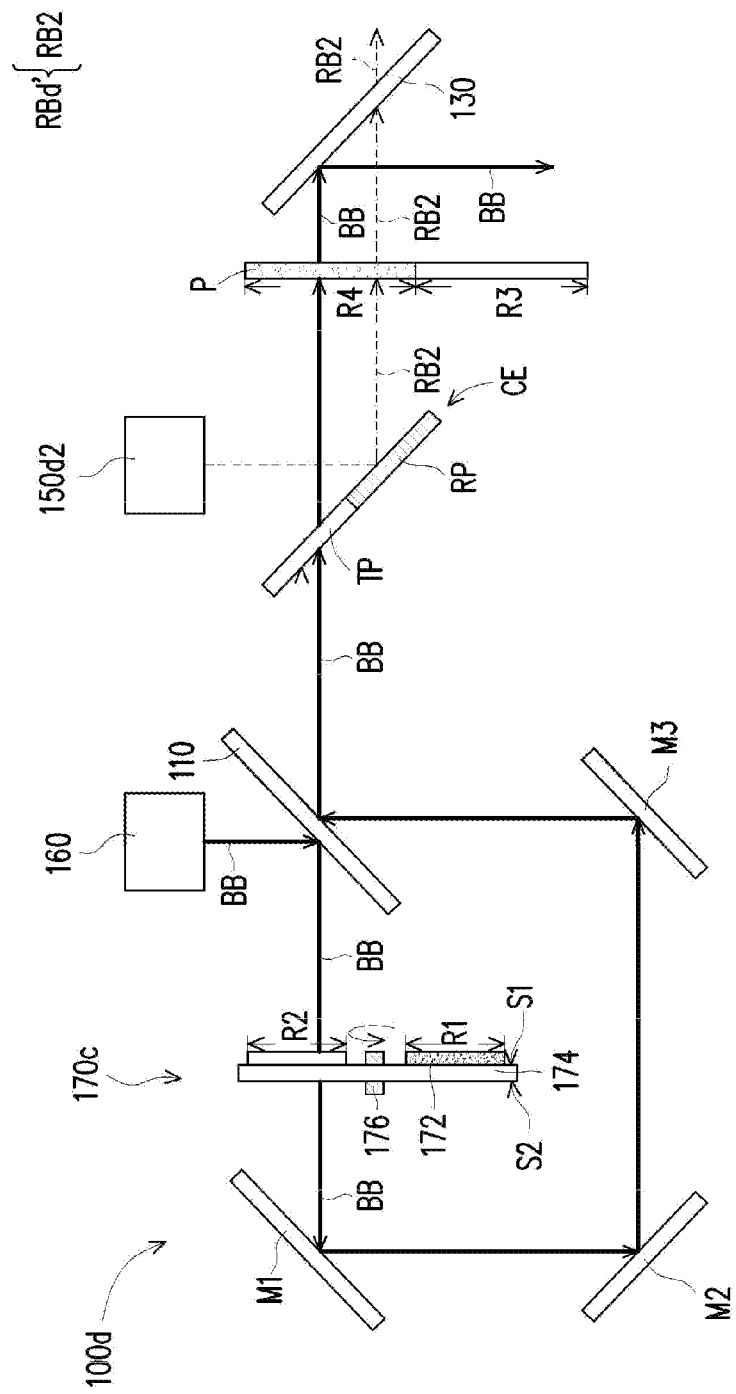
FIG. 12B is a schematic diagram of optical paths of the illumination system of FIG. 12A during a second time period.
Figure 13:
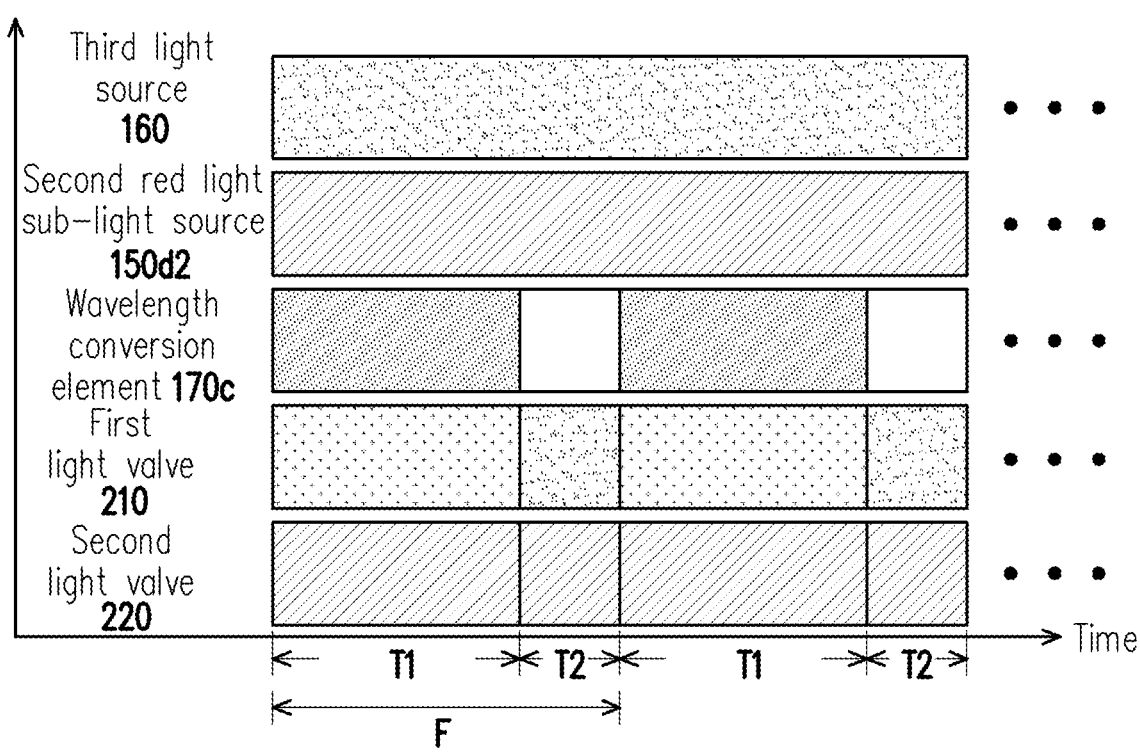
FIG. 13 is a schematic diagram of colors of light beams emitted by a third light source, a second sub-light source and a wavelength conversion element in FIG. 12A and FIG. 12B during different time periods and is a schematic diagram of colors of light beams correspondingly received by first and second light valves in FIG. 12A and FIG. 12B during different time periods.

FIG. 12A is a schematic diagram of optical paths of an illumination system during a first time period in another embodiment of the invention. FIG. 12B is a schematic diagram of optical paths of the illumination system of FIG. 12A during a second time period. FIG. 13 is a schematic diagram of colors of light beams emitted by a third light source, a second sub-light source and a wavelength conversion element in FIG. 12A and FIG. 12B during different time periods and is a schematic diagram of colors of light beams correspondingly received by first and second light valves in FIG. 12A and FIG. 12B during different time periods.

Referring to FIG. 12A and FIG. 12B together, the major difference between an illumination system 100d and the illumination system 100c of FIG. 9A and FIG. 9B is that, the illumination system 100d does not include the controller C while other components are substantially the same in terms of architecture so description regarding the architectural difference is not repeated hereinafter.

With reference to FIG. 12A and FIG. 13, during the first time period T1, optical behavior of the illumination system 100d is similar to optical behavior of the illumination system 100c, and the major difference between the two is that, a second sub-light source 150d2 emits the second sub-light beam RB2. After being reflected by the reflective portion RP, the second sub-light beam RB2 sequentially passes through the third region R3 and the third splitting element 130. The fourth light beam YB includes the first sub-light beam RB1. The first sub-light beam RB1 and the second sub-light beam RB2 commonly serve as a second light beam RBd. The first light beam GB in the fourth light beam YB is reflected by the third splitting element 130. In this way, during the first time period T1, the illumination system 100d outputs the second light beam RBd and the first light beam GB.

With reference to FIG. 12B, and FIG. 13, during the second time period T2, the second sub-light source 150d2 emits the second sub-light beam RB2. Optical behavior of the illumination system 100d is similar to optical behavior of the illumination system 100c, and thus related description is not repeated hereinafter. In this way, during the second time period T2, the illumination system 100d outputs the third light beam BB and a second light beam RBd', wherein the second light beam RBd' includes the second sub-light beam RB2.

It should be noted that, the illumination system 100d in FIG. 12A and FIG. 12B can replace the illumination system 100 of FIG. 1A and FIG. 1B to output the light beams to the first and the second light valves 210 and 220 during the first and the second time periods T1 and T2. Behaviors of the light beams outputted by the illumination system 100d during the first and the second time periods T1 and T2 are similar to behaviors of the light beams outputted by the illumination system 100 during the first and the second time periods T1 and T2, and thus related description is not repeated hereinafter.

Compared to the illumination system 100c, because the second sub-light source 150d2 in the illumination system 100d in this embodiment continuously provides the second sub-light beam RB2 during the first and the second time periods T1 and T2, the controller C does not need to control the second sub-light source 150d2 to be turned on or off during the different time periods. Moreover, during the first and the second time periods T1 and T2, in addition to the first sub-light beam RB1 provided by a conversion light source CLSd, the second light beam RBb outputted by the illumination system 100d further includes the second sub-light beam RB2 provided by the second sub-light source 150d2. Therefore, in an image frame projected by the projection apparatus applying the illumination system 100d, brightness of red light and color purity of red light are better.

Figure 14A:
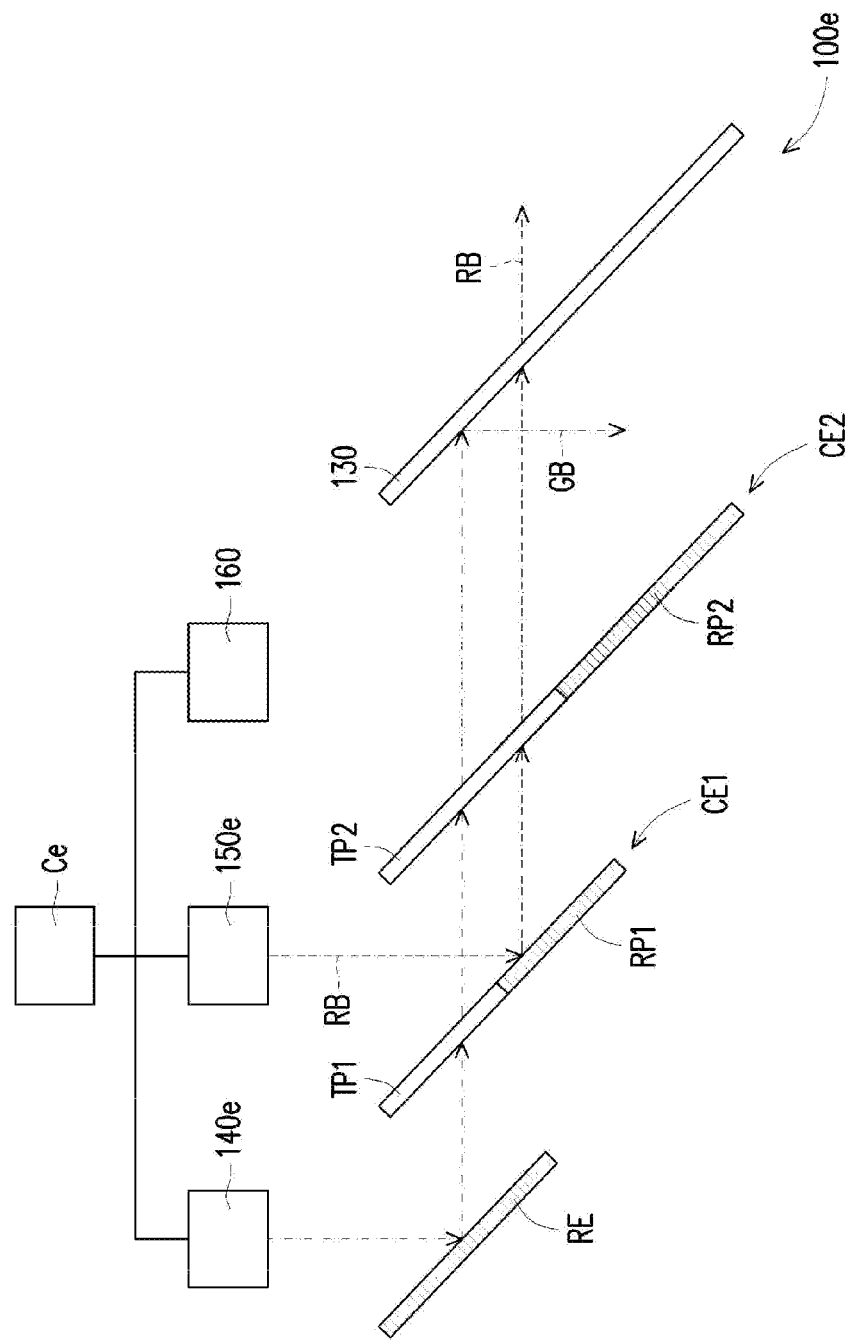
FIG. 14A is a schematic diagram of optical paths of an illumination system during a first time period in an embodiment of the invention.
Figure 14B:
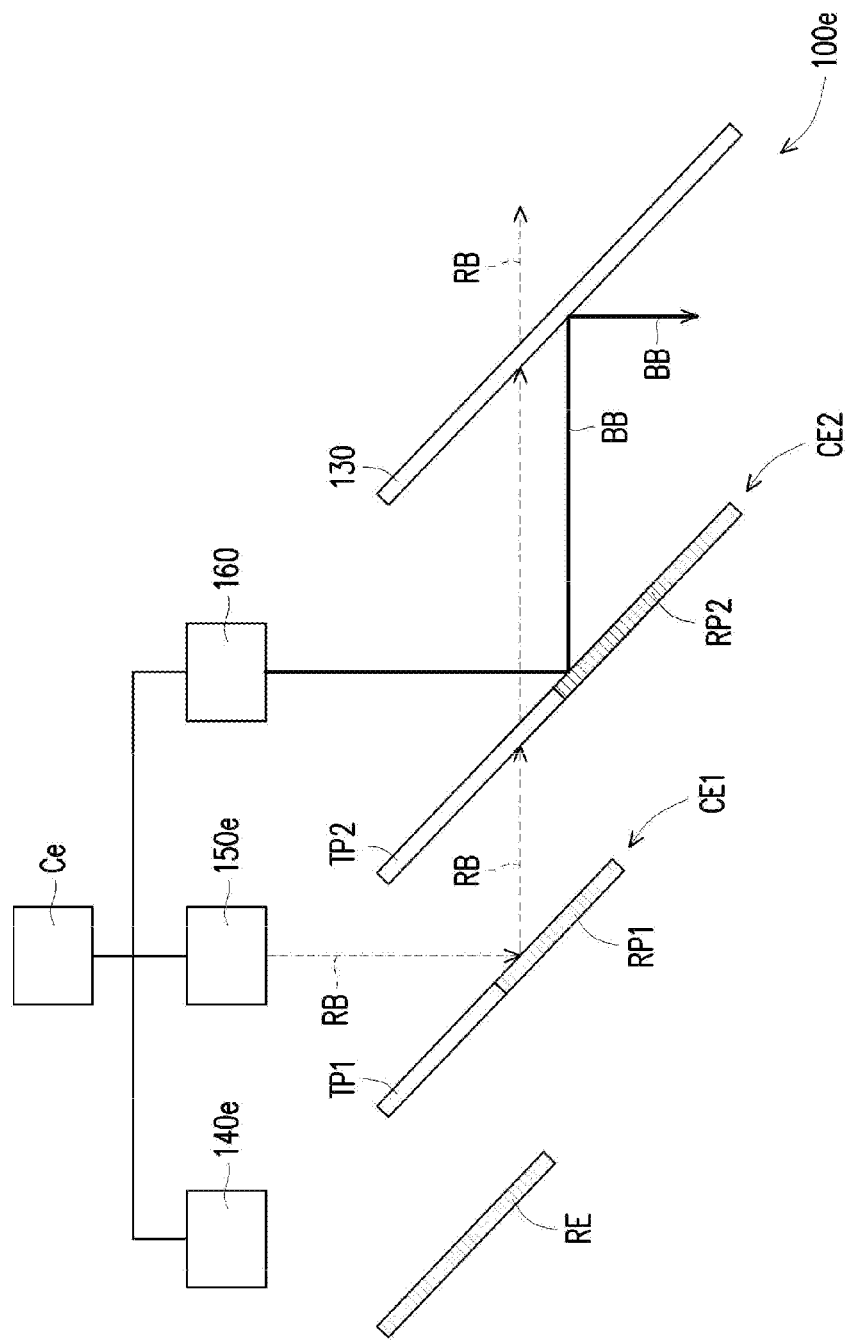
FIG. 14B is a schematic diagram of optical paths of the illumination system of FIG. 14A during a second time period.
Figure 15:
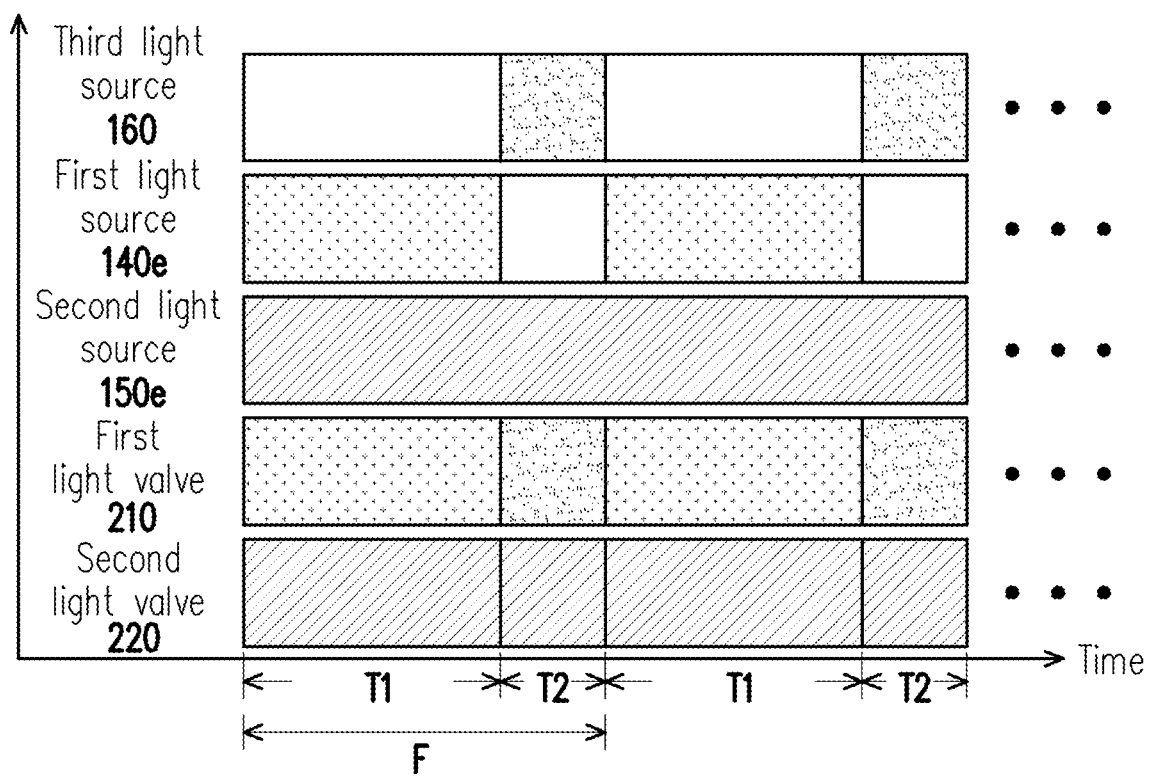
FIG. 15 is a schematic diagram of colors of light beams emitted by a third light source, a first light source and a second light source in FIG. 14A and FIG. 14B during different time periods and is a schematic diagram of colors of light beams correspondingly received by first and second light valves in FIG. 14A and FIG. 14B during different time periods.

FIG. 14A is a schematic diagram of optical paths of an illumination system during a first time period in an embodiment of the invention. FIG. 14B is a schematic diagram of optical paths of the illumination system of FIG. 14A during a second time period. FIG. 15 is a schematic diagram of colors of light beams emitted by a third light source, a first light source and a second light source in FIG. 14A and FIG. 14B during different time periods and is a schematic diagram of colors of light beams correspondingly received by first and second light valves in FIG. 14A and FIG. 14B during different time periods.

Referring to an illumination system 100e of FIG. 14A and FIG. 14B, the illumination system 100e includes a first light source 140e, a second light source 150e, the third light source 160, a reflector element RE, a first combiner element CE1, a second combiner element CE2, the third splitting element 130 and a controller Ce. The first light source 140e includes, for example, a light-emitting element that emits green light. The second light source 150e includes, for example, a light-emitting element that emits red light. The third light source 160 includes, for example, a light-emitting element that emits blue light. Aforementioned light-emitting elements include, for example, light-emitting diodes (LED) or laser diodes (LD), but not limited thereto. The controller Ce is electrically connected to the first light source 140e, the second light source 150e and the third light source 160, and configured to control whether the first light source 140e, the second light source 150e and the third light source 160 emit light or not. The reflector element RE is correspondingly disposed on the transmission path of the first light beam GB. Structures of the combiner elements CE1 to CE2 are similar to structure of the combiner element CE in FIG. 5A and FIG. 5B or may be the splitting element, and thus related description is not repeated hereinafter. A transparent portion TP1 in the first combiner element CE1 is disposed on the transmission path of the first light beam GB, and a reflective portion RP1 in the first combiner element CE1 is disposed on the transmission path of the second light beam RB. A transparent portion TP2 in the second combiner element CE2 is disposed on the transmission paths of the first light beam GB and the second light beam RB, and a reflective portion RP2 in the second combiner element CE2 is disposed on the transmission path of the third light beam BB. The third splitting element 130 is disposed on the transmission paths of the first light beam GB, the second light beam RB and the third light beam BB.

In another embodiment of the invention, structures of the combiner elements CE1 and CE2 are similar to structure of the combiner element CE in FIG. 5A and FIG. 5B to be the splitting element. With reference to the illumination system 100e of FIG. 14A and FIG. 14B, a combiner element CE may be replaced by the splitting element. The first combiner element CE1 may allow the first light beam GB to pass through and reflect the second light beam RB. The second combiner element CE2 may allow the first light beam GB and the second light beam RB to pass through and reflect the third light beam BB. Next, optical behavior of the illumination system 100e will be introduced in the following paragraphs.

With reference to FIG. 14A and FIG. 15, during the first time period T1, the controller Ce controls the first light source 140e and the second light source 150e to emit the first light beam GB and the second light beam RB, respectively, and controls the third light source 160 not to emit light. After being reflected by the reflector element RE, the first light beam GB sequentially passes through the transparent portions TP1 and TP2 to be reflected by the third splitting element 130. After being reflected by the reflective portion RP1, the second light beam RB sequentially passes through the transparent portion TP2 and the third splitting element 130. In this way, during the first time period T1, the illumination system 100e outputs the second light beam RB and the first light beam GB.

With reference to FIG. 14B and FIG. 15, during the second time period T2, the controller Ce controls the green light source 140e not to emit light and controls the red light source 150e and the third light source 160 to emit the second light beam RB and the third light beam BB, respectively. After being reflected by the reflective portion RP1, the second light beam RB sequentially passes through the transparent portion TP2 and the third splitting element 130. The third light beam BB is sequentially reflected by the reflective portion RP2 and the third splitting element 130. In this way, during the second time period T2, the illumination system 100e outputs the second light beam RB and the third light beam BB.

It should be noted that, the illumination system 100e in FIG. 14A and FIG. 14B can replace the illumination system 100 of FIG. 1A and FIG. 1B to output the light beams to the first and the second light valves 210 and 220 during the first and the second time periods T1 and T2. Behaviors of the light beams outputted by the illumination system 100e during the first and the second time periods T1 and T2 are similar to behaviors of the light beams outputted by the illumination system 100 during the first and the second time periods T1 and T2, and thus related description is not repeated hereinafter.

Figure 16A:
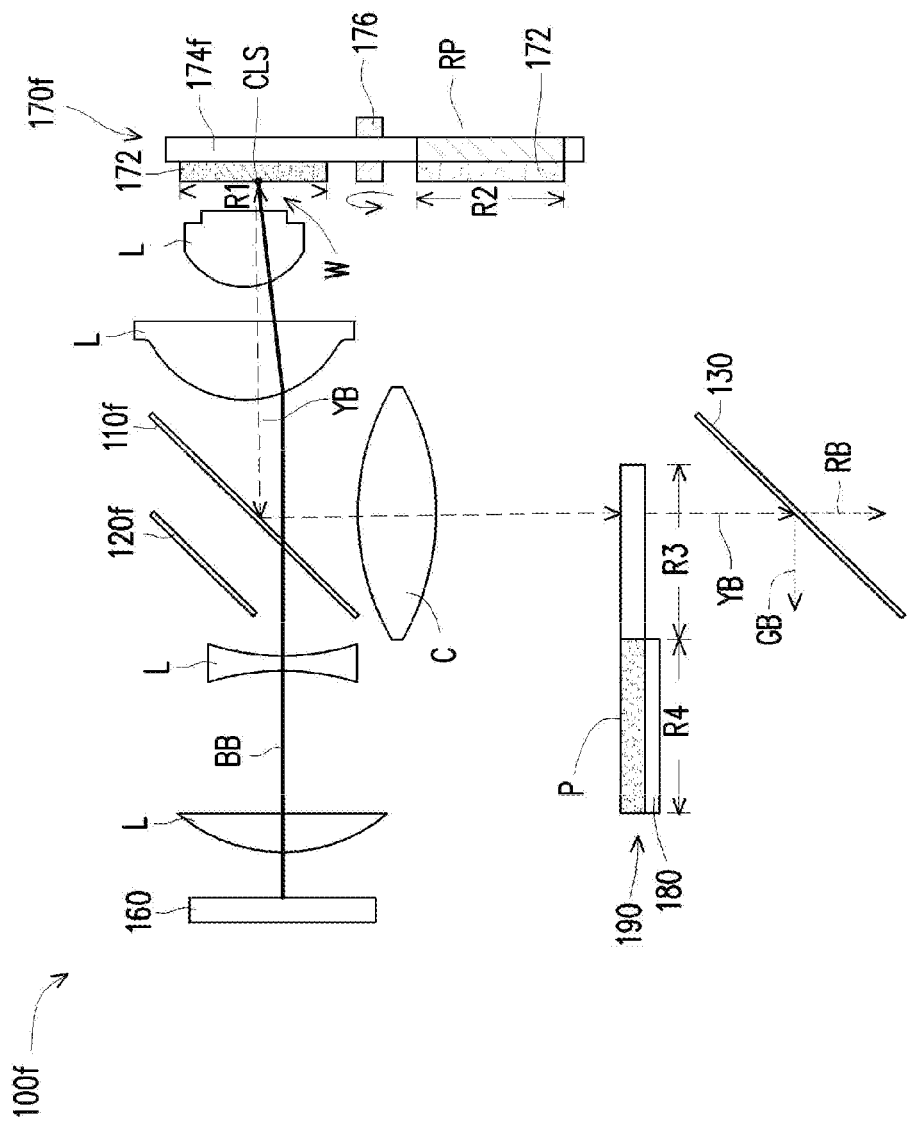
FIG. 16A is a schematic diagram of optical paths of an illumination system during a first time period in an embodiment of the invention.
Figure 16B:
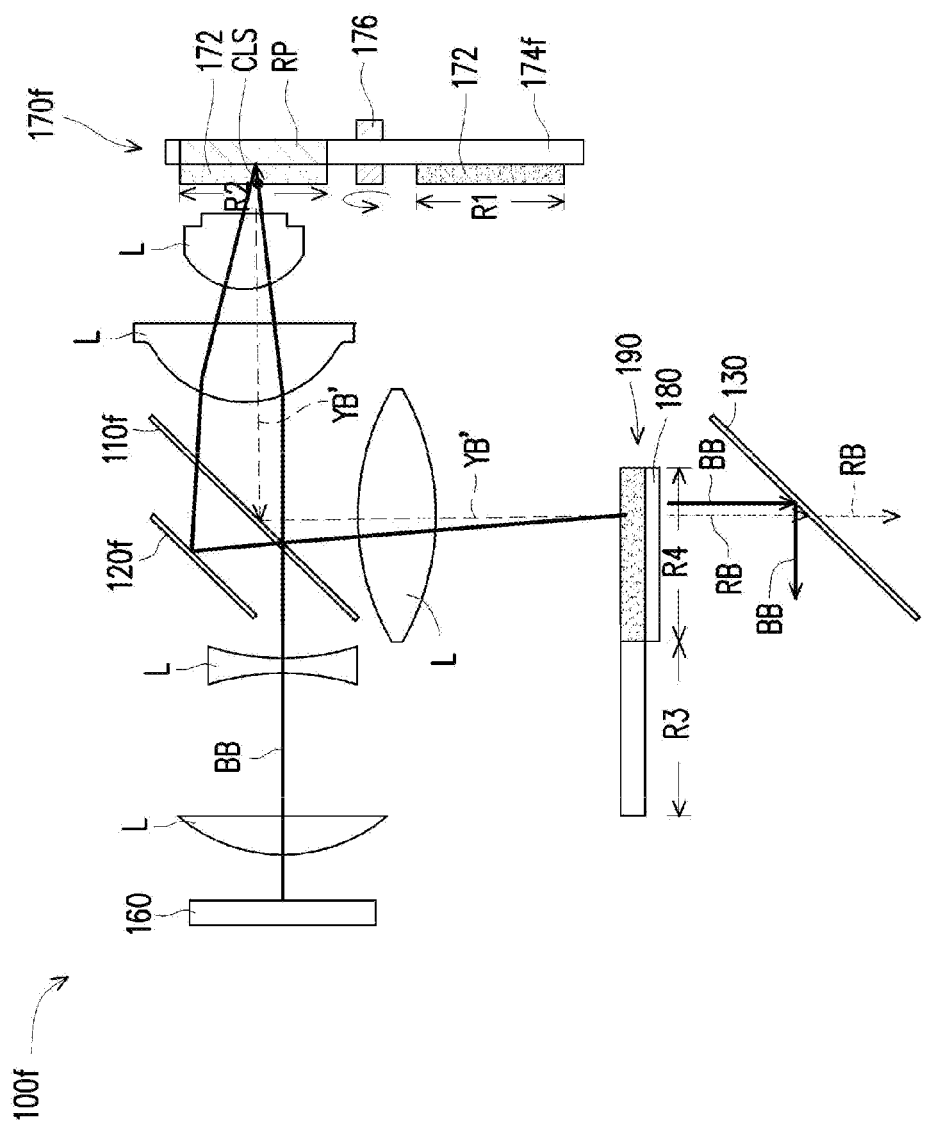
FIG. 16B is a schematic diagram of optical paths of the illumination system of FIG. 16A during a second time period.
Figure 17:
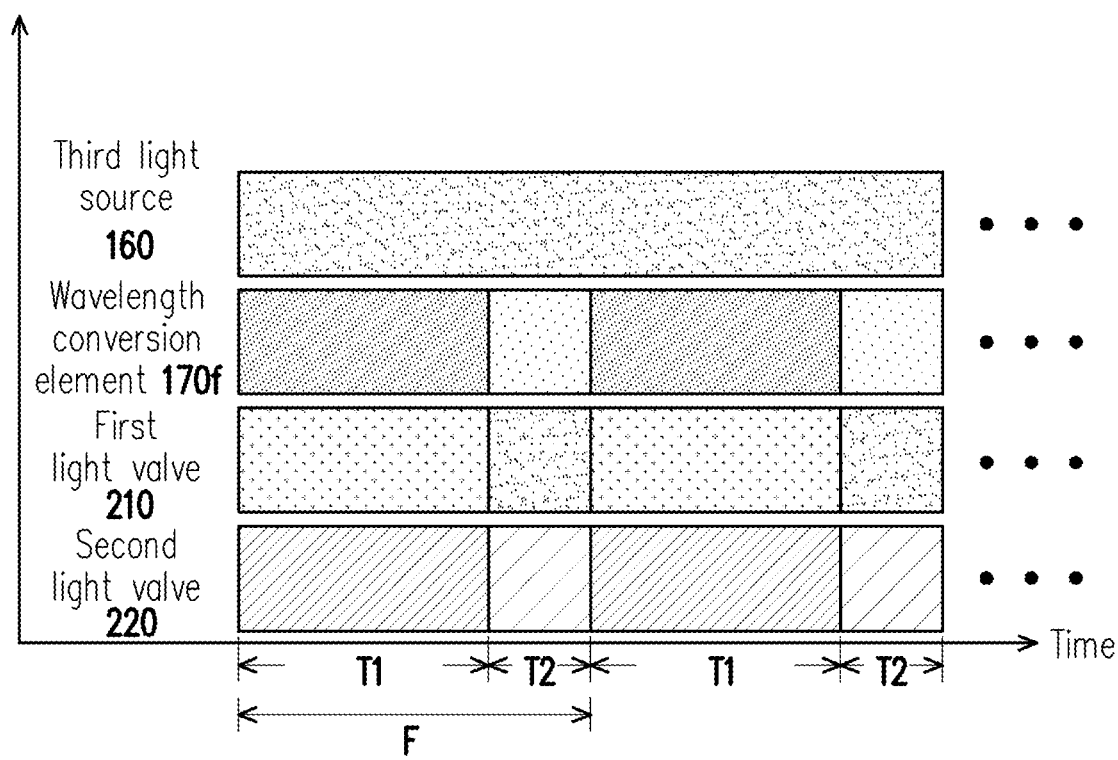
FIG. 17 is a schematic diagram of colors of light beams emitted by a third light source and a wavelength conversion element in FIG. 16A and FIG. 16B during different time periods and is a schematic diagram of colors of light beams correspondingly received by first and second light valves in FIG. 16A and FIG. 16B during different time periods.

FIG. 16A is a schematic diagram of optical paths of an illumination system during a first time period in an embodiment of the invention. FIG. 16B is a schematic diagram of optical paths of the illumination system of FIG. 16A during a second time period. FIG. 17 is a schematic diagram of colors of light beams emitted by a third light source and a wavelength conversion element in FIG. 16A and FIG. 16B during different time periods and is a schematic diagram of colors of light beams correspondingly received by first and second light valves in FIG. 16A and FIG. 16B during different time periods.

Referring to FIG. 16A and FIG. 16B together, the main architectural difference between an illumination system 100f and the illumination system 100 of FIG. 1A and FIG. 1B is that, the illumination system 100f includes a first splitting element 110f, a reflector element 120f, a wavelength conversion element 170f, the scattering element 190 and a plurality of lenses L having refracting powers. The first splitting element 110f is designed as a splitting element capable of reflecting the fourth light beam and allowing the other light beams to pass through. The reflector element 120f is designed to be able to reflect the third light beam. The wavelength conversion element 170f is a reflective phosphor wheel. Specifically, the wavelength conversion element 170f is substantially similar to the wavelength conversion element 170, and the major difference between the two is that, a substrate 174f of the wavelength conversion element 170f includes the reflective portion RP. The second region R2 of the wavelength conversion region R is correspondingly disposed on the reflective portion RP.

Referring to FIG. 16A and FIG. 17 together, during the first time period T1, the third light source 160 emits the third light beam BB. After passing through the first splitting element 110f, the third light beam BB is transmitted to the first region R1, and excites the wavelength conversion material 172 in the first region R1 to make the conversion light source CLS emit the fourth light beam YB. After being reflected by the first splitting element 110, the fourth light beam YB passes through the third region R3 of the scattering element 190 to be transmitted to the third splitting element 130. The second light beam RB in the fourth light beam YB passes through the third splitting element 130. The first light beam GB in the fourth light beam YB is reflected by the third splitting element 130.

Referring to FIG. 16B and FIG. 17 together, during the second time period T2, the third light source 160 emits the third light beam BB. The third light beam BB passes through the first splitting element 110f to be transmitted to the second region R2. A part of the third light beam BB excites the wavelength conversion material 172 in the second region R2 to make the conversion light source CLS emit the fifth light beam YB', and the fifth light beam YB' is reflected to the first splitting element 110f by the reflective portion RP. After being reflected by the reflective portion RP, another part of the third light beam BB passes through the first splitting element 110f to be reflected by the reflector element 120f, and then passes through the first splitting element 110f again to be transmitted to the third splitting element 130 through the fourth region R4 of the scattering element 190. The third light beam BB is then reflected by the third splitting element 130. In addition, the fifth light beam YB' is reflected by the first splitting element 110f and passes through the fourth region R4 of the scattering element 190. The second light beam RB in the fifth light beam YB' passes through the third splitting element 130. The first light beam GB in the fifth light beam YB' is filtered out by the filter element 180. In this way, during the second time period T2, the illumination system 100f outputs the third light beam BB and the second light beam RB.

Figure 18A:
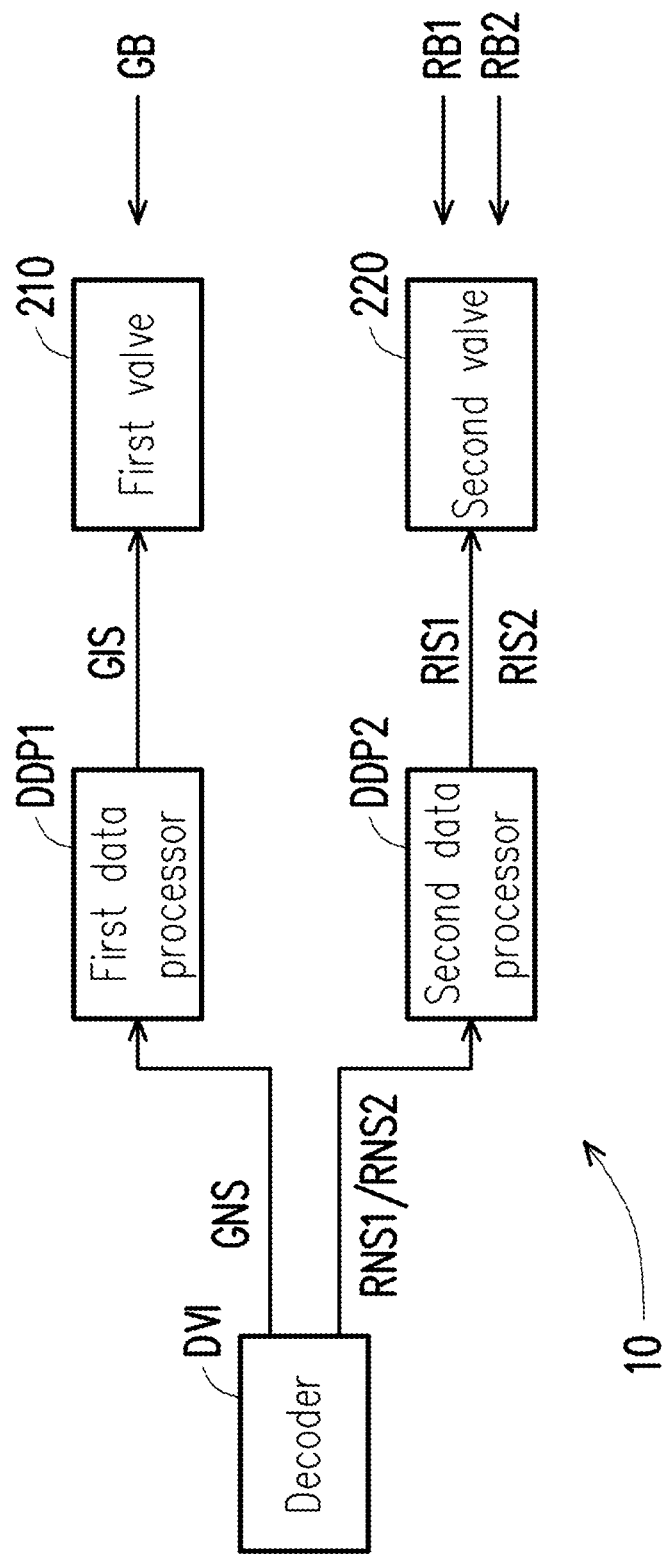
FIG. 18A is a schematic diagram of signal transmission of an image display control system applied in the projection apparatus according to the embodiments of the invention during a first time period.
Figure 18B:
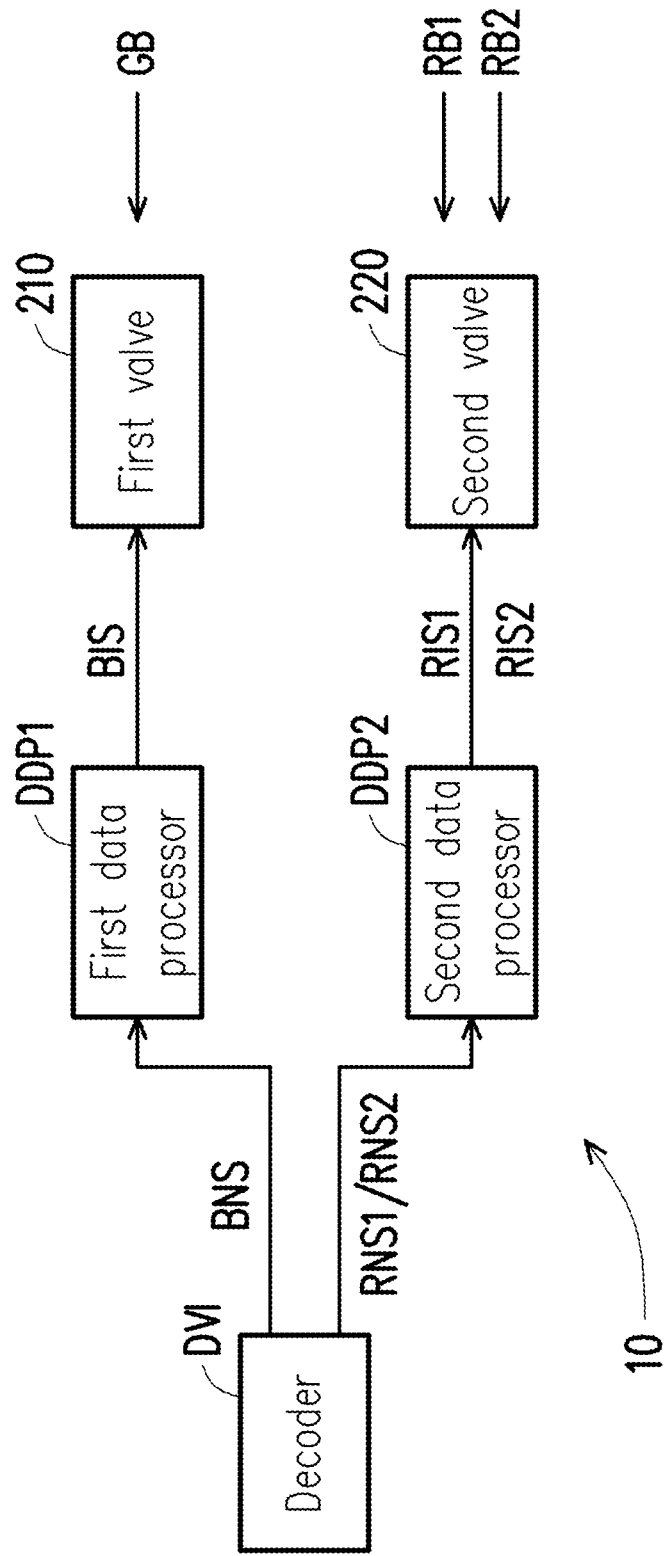
FIG. 18B is a schematic diagram of signal transmission of an image display control system applied in the projection apparatus according to the embodiments of the invention during a second time period.

It should be noted that, the illumination system 100f in FIG. 16A and FIG. 16B can replace the illumination system 100 of FIG. 1A and FIG. 1B to output the light beams to the first and the second light valves 210 and 220 during the first and the second time periods T1 and T2. Behaviors of the light beams outputted by the illumination system 100f during the first and the second time periods T1 and T2 are similar to behaviors of the light beams outputted by the illumination system 100 during the first and the second time periods T1 and T2, and thus related description is not repeated hereinafter. FIG. 18A is a schematic diagram of signal transmission of an image display control system applied in the projection apparatus according to the embodiments of the invention during a first time period. FIG. 18B is a schematic diagram of signal transmission of an image display control system applied in the projection apparatus according to the embodiments of the invention during a second time period.

With reference to FIG. 18A and FIG. 18B, an image display control system 10 includes a decoder DVI, a first data processor DDP1 and a second data processor DDP2. The decoder DVI is electrically connected to the first data processor DDP1 and the second data processor DDP2. The first data processor DDP1 is electrically connected to the first light valve 210. The second data processor DDP2 is electrically connected to the second light valve 220. Operation method of the image display control system 10 will be described in more details with the illumination system 100 in FIG. 1A and FIG. 1B as an example in the following paragraphs.

With reference to FIG. 18A, during the first time period T1, the decoder DVI sends a first notification signal GNS which notifies the first data processing DDP1 to process a green image signal, and the first light valve 210 receives the first light beam GB. After receiving the first notification signal GNS, the first data processor DDP1 sends a first light beam image modulating signal GIS to control a part of micro reflective mirrors corresponding to the first light beam GB in the first light valve 210 to be in an on-state while maintaining the rest of the micro reflective mirrors not corresponding to the first light beam GB in an off-state. Accordingly, after receiving the first light beam GB, the first light valve 210 converts the first light beam GB into the first image light beam IM1. On the other hand, the decoder DVI also simultaneously sends a first sub-light beam notification signal RNS1 which notifies the second data processor DDP2 to process a red image signal, and the second light valve 220 receives the second light beam RB (the first sub-light beam RB1) from the conversion light source CLS. After receiving the first sub-light beam notification signal RNS1, the second data processor DDP2 sends a first sub-light beam image modulating signal RIS1 to control a part of micro reflective mirrors corresponding to the first sub-light beam RB1 in the second light valve 220 to be in the on-state while maintaining the rest of the micro reflective mirrors not corresponding to the first sub-light beam RB1 in the off-state. Accordingly, after receiving the first sub-light beam RB1, the second light valve 220 converts the first sub-light beam RB1 into a part of the second image light beam IM2 through the modulating method describe above.

With reference to FIG. 18B, during the second time period T2, the decoder DVI sends a third notification signal BNS which notifies the first data processing DDP1 to process a blue image signal, and the first light valve 210 receives the third light beam BB. After receiving the third notification signal BNS, the first data processor DDP1 sends a third light beam image modulating signal BIS to control a part of micro reflective mirrors corresponding to the third light beam BB in the first light valve 210 to be in the on-state while maintaining the rest of the micro reflective mirrors not corresponding to the third light beam BB in the off-state.

Accordingly, after receiving the third light beam BB, the first light valve 210 converts the third light beam BB into the third image light beam IM3 through the modulating method describe above. On the other hand, the decoder DVI also simultaneously sends a second sub-light beam notification signal RNS2 which notifies the second data processor DDP2 to process the red image signal, and the second light valve 220 is about to receive the second sub-light beam RB2 from the second sub-light source. After receiving the second sub-light beam notification signal RNS2, the second data processor DDP2 sends a second sub-light beam image modulating signal RIS2 to control a part of micro reflective mirrors corresponding to the second sub-light beam RB2 in the second light valve 220 to be in the on-state while maintaining the rest of the micro reflective mirrors not corresponding to the second sub-light beam RB2 in the off-state. Accordingly, after receiving the second sub-light beam RB2, the second light valve 220 converts the first sub-light beam RB1 and the second sub-light beam RB2 (the second light beam RB) into the second image light beam IM2 through the modulating method describe above.

It should be noted that, the image display control system 10 is not limited only to be used in the illumination system 100 but may also be applied in other embodiments of the invention with the major difference lies where: when the second light valve 220 is ready to receive the second sub-light beam RB2 from the second sub-light source, the decoder DVI sends the second sub-light beam notification signal RNS2 to notify the second data processor DDP2, and the second light valve 220 is about to receive the second sub-light beam RB2 from the second sub-light source. Description regarding the above is similar to the foregoing description, which is not repeated hereinafter.

In summary, in the illumination system according to the embodiments of the invention, with disposition of the splitting element, the first light beam and the second light beam are transmitted to the different (first and second) positions during the first time period, and the third light beam and the second light beam are transmitted to the different (first and second) positions during the second time period. As a result, the first and the second light valves respectively at two different (first and second) positions can receive the light beams during the first and the second time periods for converting the corresponding image light beams to reduce the idle condition so optical efficiency and image quality may be improved for the entire projection apparatus.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Any of the embodiments or any of the claims of the invention does not need to achieve all of the objects, advantages or features disclosed by the invention. Moreover, the abstract and the invention name in this disclosure are merely used to aid in searches of patent files and are not intended to limit the scope of the claims of the invention. In addition, the terms such as "first" and "second" as recited in the specification or the claims are intended to give the elements names or distinguish different embodiments or scopes, the maximum number or the minimum number of the elements is not limited thereto.

What is claimed is:

1. An illumination system, comprising:
a first light source adapted to emit a first light beam;
a second light source adapted to emit a second light beam;
a third light source adapted to emit a third light beam;
a splitting element disposed on transmission paths of the first light beam, the second light beam and the third light beam, and wherein the splitting element reflects the third light beam and the first light beam and allows the second light beam to pass through; and
a wavelength conversion element, wherein the wavelength conversion element comprises a wavelength conversion material, and the wavelength conversion element has a first region and a second region, wherein a concentration of the wavelength conversion material in the first region is greater than a concentration of the wavelength conversion material in the second region, the concentration of the wavelength conversion material in the second region is greater than zero, and the third light beam serves as an exciting light beam, wherein the first region and the second region sequentially enter into a transmission path of the third light beam such that the third light beam is transmitted to an irradiation region of the wavelength conversion material, the irradiation region serves as a conversion light source, the conversion light source comprises the first light source and the second light source or the first light source and at least part of the second light source, the conversion light source emits a fourth light beam, the fourth light beam comprises the first light beam and the second light beam, the splitting element is disposed on the transmission paths of the third light beam and the fourth light beam, the splitting element reflects the first light beam and the third light beam and allows the second light beam to pass through, wherein the third light beam excites the wavelength conversion material in the first region to make the conversion light source emit the fourth light beam, and
wherein, during a first time period, the third light source emits the third light beam, and the third light beam is transmitted to the irradiation region of the wavelength conversion material to emit the fourth light beam, the fourth light beam is split by the splitting element to form the first light beam and the second light beam, the first light beam is transmitted to a first position by the splitting element, and the second light beam is transmitted to a second position by the splitting element, wherein the first position is different from the second position, and
during a second time period, the third light source emits the third light beam such that at least part of the third light beam is operated by the wavelength conversion element and transmits to the splitting element, and the third light beam is transmitted to the first position by the splitting element, and the second light source emits the second light beam, the second light beam is transmitted to the second position by the splitting element.

2. The illumination system according to claim 1, wherein, during the second time period, another part of the third light beam excites the wavelength conversion material in the second region to emit a fifth light beam and the fifth light beam is split by the splitting element to form another part of the first light beam and another part of the second light beam.

3. The illumination system according to claim 2, wherein the second light source further comprises a first sub-light source and a second sub-light source, and the conversion light source comprises the first sub-light source, wherein, during the first time period, a first sub-light beam emitted by the first sub-light source serves as at least part of the second light beam, and during the second time period, a second sub-light beam emitted by the second sub-light source serves as at least part of the second light beam.

4. The illumination system according to claim 3, wherein during the first time period, the first sub-light beam emitted by the first sub-light source and the second sub-light beam emitted by the second sub-light source commonly serve as the second light beam.

5. The illumination system according to claim 1, wherein the second region of the wavelength conversion element is further disposed with a filter element, and the filter element is configured to filter out the first light beam.

6. A projection apparatus, comprising:
an illumination system comprising:
a first light source adapted to emit a first light beam;
a second light source adapted to emit a second light beam;
a third light source adapted to emit a third light beam;
a splitting element disposed on transmission paths of the first light beam, the second light beam and the third light beam, and wherein the splitting element reflects the third light beam and the first light beam and allows the second light beam to pass through; and
a wavelength conversion element, wherein the wavelength conversion element comprises a wavelength conversion material, and the wavelength conversion element has a first region and a second region, wherein a concentration of the wavelength conversion material in the first region is greater than a concentration of the wavelength conversion material in the second region, the concentration of the wavelength conversion material in the second region is greater than zero, and the third light beam serves as an exciting light beam, wherein the first region and the second region sequentially enter into a transmission path of the third light beam such that the third light beam is transmitted to an irradiation region of the wavelength conversion material, the irradiation region serves as a conversion light source, the conversion light source comprises the first light source and the second light source or the first light source and at least part of the second light source, the conversion light source emits a fourth light beam, the fourth light beam comprises the first light beam and the second light beam, the splitting element is disposed on the transmission paths of the third light beam and the fourth light beam, the splitting element reflects the first light beam and the third light beam and allows the second light beam to pass through, wherein the third light beam excites the wavelength conversion material in the first region to make the conversion light source emit the fourth light beam, and
wherein, during a first time period, the third light source emits the thir light beam, and the third light beam is transmitted to the irradiation region of the wavelength conversion material to emit the fourth light beam, the fourth light beam is split by the splitting element to form the first light beam and the second light beam, the first light beam is transmitted to a first position by the splitting element, and the second light beam is transmitted to a second position by the splitting element, wherein the first position is different from the second position, and
during a second time period, the third light source emits the third light beam such that at least part of the third light beam is operated by the wavelength conversion element and transmits to the splitting element, and the third light beam is transmitted to the first position by the splitting element, and the second light source emits the second light beam, the second light beam is transmitted to the second position by the splitting element;
a first light valve is disposed at the first position, and configured to receive the first light beam and the third light beam and correspondingly convert the first light beam and the third light beam into a first image light beam and a third image light beam respectively;
a second light valve is disposed at the second position, and configured to receive the second light beam and correspondingly convert the second light beam into a second image light beam; and
a projection lens is disposed on transmission paths of the first image light beam, the second image light beam and the third image light beam.

7. The projection apparatus according to claim 6, wherein, during the second time period, another part of the third light beam excites the wavelength conversion material in the second region to emit a fifth light beam and the fifth light beam is split by the splitting element to form the first light beam and another part of the second light beam.

8. The projection apparatus according to claim 7, wherein the second light source further comprises a first sub-light source and a second sub-light source, and the conversion light source comprises the first sub-light source, wherein, during the first time period, a first sub-light beam emitted by the first sub-light source serves as at least part of the second light beam, and during the second time period, a second sub-light beam emitted by the second sub-light source serves as at least part of the second light beam.

9. The projection apparatus according to claim 8, wherein during the first time period, the first sub-light beam emitted by the first sub-light source and the second sub-light beam emitted by the second sub-light source commonly serve as the second light beam.

10. The projection apparatus according to claim 8, wherein the projection apparatus further comprises an another splitting element, another splitting element is disposed on the transmission paths of the first image light beam, the second image light beam and the third image light beam, and another splitting element reflects the second image light beam and allows the first image light beam and the third image light beam to pass through.

11. The projection apparatus according to claim 6, wherein the second region of the wavelength conversion element is further disposed with a filter element, and the filter element is configured to filter out the first light beam.

* * * * *